United States Patent
Baisch et al.

(10) Patent No.: US 8,610,998 B2
(45) Date of Patent: Dec. 17, 2013

(54) COLOURED ORGANIC ELECTROPHORETIC PARTICLES

(75) Inventors: Gabriele Baisch, Binzen (DE); Reinhold Öhrlein, Rheinfelden-Herten (DE); Peter Simmendinger, Basel (CH); Gerardus De Keyzer, Riehen (CH); Margherita Fontana, Basel (CH); Vilas N. Mumbaikar, Mumbai (IN)

(73) Assignee: BASF SE, Ludwigshafen (DE)

( * ) Notice: Subject to any disclaimer, the term of this patent is extended or adjusted under 35 U.S.C. 154(b) by 684 days.

(21) Appl. No.: 12/308,594

(22) PCT Filed: Jun. 25, 2007

(86) PCT No.: PCT/EP2007/056298
§ 371 (c)(1),
(2), (4) Date: May 24, 2011

(87) PCT Pub. No.: WO2008/003604
PCT Pub. Date: Jan. 10, 2008

(65) Prior Publication Data
US 2011/0216392 A1    Sep. 8, 2011

(30) Foreign Application Priority Data
Jul. 5, 2006 (EP) .................................. 06116597

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ........... 359/296; 345/107; 524/110, 503, 556; 252/301, 35, 500, 583, 586; 525/153, 525/328.2, 328.6, 349, 379; 526/280, 310, 526/312, 316, 184, 190, 192, 193
See application file for complete search history.

(56) References Cited

U.S. PATENT DOCUMENTS

| | | | |
|---|---|---|---|
| 4,855,282 A | | 8/1989 | Satomura et al. .............. 503/218 |
| 4,880,432 A | * | 11/1989 | Egan et al. ........................ 8/647 |
| 4,918,123 A | | 4/1990 | Yang et al. ..................... 524/110 |
| 4,920,187 A | * | 4/1990 | Kashihara et al. ............. 526/193 |
| 5,610,250 A | * | 3/1997 | Veregin et al. .............. 526/219.3 |

(Continued)

FOREIGN PATENT DOCUMENTS

| | | |
|---|---|---|
| DE | 102004051072 | 4/2006 |
| EP | 0621322 | 10/1994 |
| GB | 1270254 | 4/1972 |
| WO | 94/28202 | 12/1994 |

OTHER PUBLICATIONS

Patent Abstracts of Japan Publication No. 2004354890, Dec. 16, 2004.

(Continued)

*Primary Examiner* — Loha Ben
(74) *Attorney, Agent, or Firm* — Shiela A. Loggins

(57) ABSTRACT

The present invention relates to the preparation and use of (colored) organic particles carrying electric charge as electrophoretic (image) displaying particles, to electrophoretic dispersions comprising the organic particles carrying electric charge, electrophoretic (image) devices (especially displays) comprising the colored organic particles carrying electric charge, to the novel functionalized particles, and to their use. The particles are obtainable according to a method represented by the reaction scheme as given in FIG. 1.

29 Claims, 1 Drawing Sheet

(56) References Cited

U.S. PATENT DOCUMENTS

| | | |
|---|---|---|
| 6,509,125 B1 | 1/2003 | Ito et al. .......................... 430/7 |
| 6,548,484 B1 * | 4/2003 | Christian ........................ 514/25 |
| 6,767,974 B1 * | 7/2004 | Keoshkerian et al. ......... 526/75 |
| 6,987,174 B2 * | 1/2006 | Araki ............................ 534/862 |
| 7,169,931 B2 * | 1/2007 | Takemoto et al. ............ 548/195 |
| 7,345,031 B2 * | 3/2008 | Christian ........................ 514/62 |
| 2004/0059044 A1 | 3/2004 | Olson et al. ................... 524/503 |
| 2005/0267252 A1 | 12/2005 | Minami ........................ 524/556 |
| 2008/0029739 A1 | 2/2008 | Jeganathan et al. ...... 252/301.35 |

OTHER PUBLICATIONS

F. Ganachaud et al., Polymers for Advanced Technologies, vol. 6, (1995), pp. 480-488.

W. Ford et al., Langmuir, vol. 9, (1993), pp. 1698-1703.

Z. Liu et al., Polymer, vol. 41, (2000), pp. 7023-7031.

D. Horak et al., Journal of Polymer Science Part A, Polymer Chemistry, vol. 33, (1995), pp. 2961-1968.

F. Winnik et al., Eur. Polym. J., vol. 23, No. 8, (1987), pp. 617-622.

\* cited by examiner

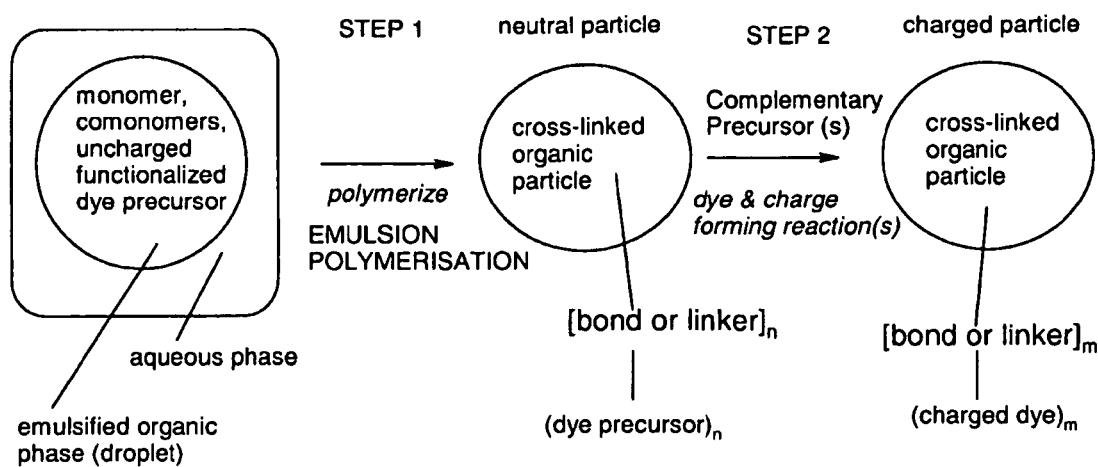

COLOURED ORGANIC ELECTROPHORETIC PARTICLES

SUMMARY OF THE INVENTION

The present invention relates to the preparation and use of organic particles carrying electric charge (especially charged colored particles), as electrophoretic (image) displaying particles, to stable electrophoretic dispersions comprising the organic particles carrying electric charge, electrophoretic (image) devices (especially displays) comprising the colored organic particles carrying electric charge, to the novel functionalized particles, to processes and methods for their synthesis and to their use especially in e-paper, paints, lacquers, electrostatic toners, inks additives to plastics and polymers, sealants, colorfilters, adhesives or cementing materials, in printing systems, LED-coatings, packaging, tagging and labeling applications, as well as to other embodiments represented below.

BACKGROUND OF THE INVENTION

In recent years, with the evolution of information technologies, the standards and demand for low power and thin display devices have risen, so that extensive investigations have been made on display devices, related equipment and chemical entities fitted to these needs.

Electrophoretic displays known so far generally comprise a multiplicity of electrically charged electrophoretic particles which are dispersed in a space between a pair of substrates, each with one or more electrodes, together with a dispersion medium which is filled in the space and colored in a color different from the color of the electrophoretic particles. In the space between the substrates, a partition wall arrangement is formed so that it divides the space into a multiplicity of pixels along a planar direction alongside and between the substrates. By forming such a partition wall arrangement, it is possible to define the space in between the pair of substrates while preventing complete local fixing of the eletrophoretic particles.

If a voltage is applied between the electrodes, the charged eletrophoretic particles move to the electrode having the opposite polarity to their charge and can, for example, due to the motive power with the force exerted by the electric field, be collected there to cover an observer's side electrode, so that a color identical to the color of the electrophoretic particles is displayed when the electrophoretic display device is observed from the observer's side. Thus, any image (including characters) can be displayed by a multiplicity of pixels.

Today's state of the art concerning e. g. electronic paper, one potential application of the claimed particles, is the already existing black and white or light color electronic paper as a display using electronic inks, bases on bright/dark contrast. Electronic ink is a material that is processed into a film for integration into electronic displays. The principal components of electronic paper devices are outlined in WO 94/28202 and US 2005/0267252. In brief: a multiplicity of charged particles is dispersed in a dielectric medium spaced between two switchable electrodes—one of them being of a transparent material—of opposite charge that can be switched on or off. This array is conveniently divided into a multiplicity of pixels. As already described above in general, in such an electrophoretic display device, when e.g. a negative polarity is applied to a transparent electrode and a positive voltage to the electrode on the opposite side, the positively charged nano-particles will migrate to the transparent electrode and thereby display their coloration to the observer. If the polarity of the electrodes is reversed, the particles migrate to the bottom electrode and the observer will see the coloration of the dielectric medium or the coloration of a second species of particles in the same pixel, however, of opposite charge with respect to the charge of the previous particle species.

It is of importance for electrophoretic displays, especially for electronic paper, that, once some contents are displayed, the display can be retained for a longer period of time even though a voltage is no longer applied. With this approach an image or a text can be visualized practically permanently on displays surfaces.

The main disadvantages of today's available technologies mainly are due to the lack of a truly full color system. Moreover, there is a need for charged colored particles which can be easily dispersed in non-polar media, and which are able to retain their charge upon switches of the electric field. In order to obtain this, colored particles are required which combine several functionalities like charge, steric stabilizing groups, and dyes covalently or irreversibly attached to them.

To replace the black and white state devices by a coloured electronic paper display, it is a requirement to have coloured charged particles (e.g. green, blue and red or magenta, yellow, and cyan) of appropriate size and homodispersity, which can be guided by electrophoretic movements like the black and white particles as described above, when sandwiched, or comprised between a positive and negative electrode.

In order to be applied in any kind of electrophoretic devices, the particles have to comply with a range of requirements. For example for a transmissive type electrophoretic display application, the particle size must be in the nanometer (nm) range, whereas for a scattering type electrophoretic displays, the particles have to be in the micrometer range. The whole assembly of the particles has to be of a similar to equal size, meaning a highly homodisperse distribution. In addition, the shape of the particles should be of a similar or the same morphology, meaning preferably homomorphous spherical. In order to migrate in an electric field, the particles have to carry a stable, covalently bound, or irreversibly bound defined charge, or chargeable groups. In addition, the particles should be collidal stable, preferably should not settle irreversibly, aggregate or diffuse once the external voltage is turned off, for which it is useful to be capable of adjusting the density of the particles and the dielectric medium in the desired manner. It should also be possible to achieve that the particles possess a brittleness or softness, respectively, to such an extent as to allow to avoid wear off by abrasion when used for an extended period of time and on-off-cycles of the electrical field. Further important demands are good color intensity and color strength of the particles. Furthermore, the particles have to be dispersible in the dielectric medium. Moreover the conductivity of the dispersion comprising the charged particles, has to be minimal, in order to avoid power consumption, and other undesirable effects during the device operation. Yet further, both the electrophoretic dispersion medium and the single chemical components of the particles have to be chemically compatible.

There are several approaches to meet at least some of said requirements, e. g. in WO 94/28202, where organic or inorganic pigment particles are wrapped with a charged polymer. However those particles do not fulfill all requirements. They are only of low homodispersity and are too large, for example, for the transmissive type approach. In addition, the applied radical polymerisation technology for inclusion of the pigment particles and dyes in a charged particle is only rarely compatible with the chemical structure of the dyes and pigments used.

A similar approach is disclosed in US 2005/0267252, where preformed pigment particles are coated with a charged polymer shell. In this case the pigment particles need to be prefunctionalized to be incorporated into the desired particles, which is only possible satisfactorily with the exemplified inorganic pigments. Chemical compatibility with the radical polymerization conditions is rarely given for multifunctional organic dyes and pigments; not to mention the technically difficult targeted derivatisation of the latter compounds in chemical reactions.

There are also numerous reports which describe the incorporation of colored substances—dyes or pigments—into or onto preformed organic particles via a linker on the polymeric particle or the colored component or the copolymerization of functionalized dyes with monomers to form colored polymeric particles (F. M. Winnik et al. Eur. Polym. J. 1987, 23(8), 617-622, or U.S. Pat. No. 6,509,125). In these cases the desired charge of the particles has to be introduced in a separate step; moreover, in many cases the functionalized dye precursor, especially when already charged, is not soluble in the applied liquid monomer components, which leads to phase separation of the colored comonomers and/or incomplete polymerization and formation of large amounts of undesired coagulates (D. Horak et al. J. Poly. Sci.: Part A, Polym. Hem. 1995, 33, 2961-2968).

On the other hand, there a many papers which describe the preparation of charged particles via copolymerizing uncharged and charged monomers in an emulsion polymerisation (Z-Liu et al. Polymer 2000, 41, 7023-7031; W. T. Ford et al. Langmuir 1993, 9, 1698-1703; or F. Ganachaud et al. Polymers for advanced Technologies, vl. 6, pp 480-488, John-Wiley Ltd. 1994). However, as stated in these papers, the ratio of charged versus uncharged monomers significantly influences the rate of polymerization, the yield of polymers and particle size and particle morphology. In any case, there is no general protocol for the synthesis of highly charged particles especially for the nano-meter range. The difficulty is that the mentioned parameters can not be adjusted independently from each other as desirable for the preparation of colored charged particles as stated above for their intended use.

The copolymerisation of charged dyes is possible when less demanding features of products are satisfactory as for instance in bulk polymers (U.S. Pat. No. 6,509,125 or EP 0621 322). In general the synthesis of polymers containing both hydrophobic and hydrophilic—charged—functionalities presents difficulties (U.S. Pat. No. 4,918,123). Thus, the preparation of highly charged small (especially nano-) particles—preferably in the desired low nano-meter range—can not be achieved that way because of electrostatic repulsion which results during the synthesis between the incoming charged dye monomer and the already formed charged particles, which already carry a low charge of the same polarity.

As emulsion polymerisation, which gives well defined homodisperse particles in the nano-meter range, is sensitive to many variables that have to be tuned individually and any change of one variable requires all of the other factors to be adjusted, we chose the following broader approach.

The deficiencies described above provide evidence that there is a strong need for additional electrophoretic functional particles as well as methods for their synthesis and use which avoid or diminish at least some of the disadvantages of the prior art as described above and, in addition, show at least one of the desired features also mentioned above, especially, but not only, stable and good dispersable electrophoretic particles in the nano-meter range.

GENERAL DESCRIPTION OF THE INVENTION

The present invention provides charged colored ("electrophoretic") particles, ranging from the micrometer to the nanometer range, but preferably in the low nano-meter range, which can be advantageously used for various type of electrophoretic displays and which enable to cover the full colour range, even in a transmissive way where the particles are smaller than the wavelength of visible light.

The subject matter of the present invention is based on the idea of, in a first step of emulsion polymerisation, copolymerizing an uncharged polymerizably functionalized (organic) precursor (also called "Copolymerizable Precursor" hereinafter) of a covalently bound charged dye (that is especially a precursor that forms or is a component of a targeted charged covalently bound dye moiety including a chromophore and, together with one or more chargeless precursors represented by one or more separate molecules and/or the group(s) resulting from the polymerization of the Copolymerizable Precursor itself (that is, the copolymerized moiety resulting from the copolymerization of the Polymerizable Precursor) that together with the uncharged precursor or, if desired, after a further reaction can form a complete charged dye radical in a further step (see below)). The Copolymerizable Precursor is preferably highly soluble in the comonomer or comonomer mixtures and compatible with the polymerisation conditions. Subsequently, one or more organic precursors able to complete the charged dye radical (also called "Chargeless Educt(s)" hereinafter, this term also including the particle-bound moiety resulting from the copolymerization of the corresponding Copolymerizable Precursor itself) are reacted in order to cause charge formation during the reaction or by an additional reaction and to complete the dye radical (especially its chromophore), are reacted with the polymer-bound uncharged precursor moiety obtainable in the first reaction step to complete the polymer to one that (then) carries covalently bound charged dye radicals (that is, by the reaction(s) in the second step a charged colored dye and thus charged colored particles are generated). The final particle optionally contains other functional groups which help to tune the properties of the electrophoretic dispersion.

This concept has a series of advantages compared to the known protocols:

The obtainable dye radicals, charge carrying groups and steric stabilizing groups are covalently attached to the particles. Neither the dye nor the charge and stabilizer can bleed off. The charge density and the amount of color can be well adjusted, e.g. by the amount and/or concentration of the uncharged functionalized precursor and/or the Chargeless Educt forming the charged dye radical. There is no demixing or agglomeration of charged colored molecules in the oil phase, and a homogeneous distribution of color and finally charge on the particles is possible, not forming an undesirable patch work. Higher color loadings are obtainable than with known processes: Thus, labile colors may be stabilized by covalent attachment. There is no decomposition of dye molecules during the polymerization procedure, leading to further increased chromophore loadings. In case of radical polymerization, there is no inhibition of the radical polymerization chain by dye molecules resulting in adverse low molecular fragments and heterodisperse particles. Especially, there is no electrostatic repulsion of charged molecules impairing high charge loading on the particles during the synthesis. The copolymerisation of charged and uncharged monomers, which would impair the preparation of particles of defined size especially in the low nano-meter range, of defined dispersity and of defined morphology, is avoided by the outlined approach.

Emulsion polymerizations, preferably without the addition of organic solvents, further allow the reproducible preparation of spherical particles of homogenous or defined size, triggered by the reaction conditions, with high yields. Color intensive and homodisperse particles in the nano-meter range, obtainable according to this concept, are highly desirable for applications in devices based on the use as electrophoretic particles. By choosing the appropriate carrier polymer the particles are dispersible and compatible with dielectric media applied.

With this approach and by using dyes of different color, it is possible to synthesize substantially homodisperse particles with any colour needed, with a wide range of zeta potential, which are stable in dispersions. As the particle size is easy to tune in a narrow particle size distribution, it is even possible to produce transparent, semi-transparent or opaque coloured particles. This is important as for different display approaches either transparent or opaque coloured particles are of special usefulness or even required.

The concept outlined does exclude metal chelate colors and their precursors, respectively. In other terms, the dyes to be synthesized are no metal chelate dyes, especially as these dyes tend to bleed out and/or to aggregate. Also, pure protonation/deprotonation in order to form a charge in the second (or further) step preferably are not charge-forming reactions within the scope of the present invention; such reactions, however, may be used in subsequent steps when counter ion exchange concerning the charged particles is desired.

The colored particles obtainable by this method (which, for example, have a higher charge density and/or a higher dye radical (and thus chromophore) load (with a higher dye radical concentration in the matrix than particles obtained according to prior art methods) and/or a more homogenous dye radical distribution within their matrix, their use in eletrophoretic displaying devices, electrophoretic dispersions comprising these particles, and their uses are further embodiments and aspects of the invention.

BRIEF DESCRIPTION OF THE DRAWINGS

The principle is outlined in FIG. 1 for a preferred radical emulsion polymerization and dye radical and charge formation:

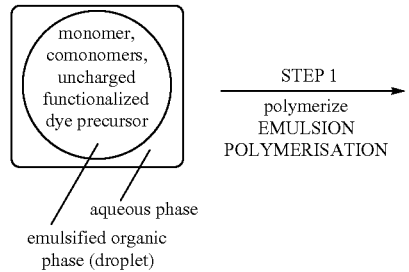

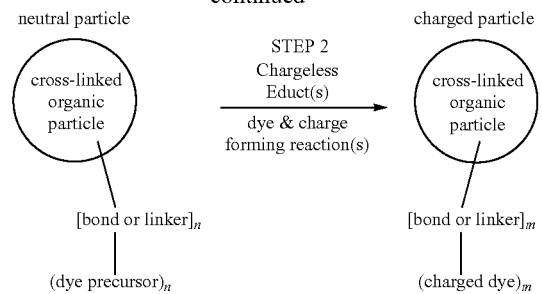

wherein n and m are natural numbers≥1 with m≤n and uncharged functionalized dye precursor stands for the Copolymerizable Precursor.

DETAILED DESCRIPTION OF THE PREFERRED EMBODIMENTS

In a first embodiment, the invention relates to a process (or method) of manufacture for charged colored particles, comprising, in a first step, copolymerizing an uncharged polymerizably functionalized precursor of a (covalently polymer bound) charged dye radical (including a chromophoric moiety) in an emulsion polymerization reaction and, in a second step, reacting at least one organic precursor of the charged dye radical able to complete the dye radical in said second step, which leads to charge formation during the reaction itself and/or one or more further subsequent reactions (i.e., itself is not charged before the reaction); e.g. also by cyclization (e.g. by an acid in the presence of an oxidizing agent), by alkylation with quaternization of a nitrogen (leading to a positive charge), (e.g. oxidation (leading to positive charge) or reduction (leading to negative charge), and completes the dye radical, using the polymer-bound uncharged precursor moiety obtainable in the first reaction step, to form a polymer particle that carries one or more covalently bound charged dye radicals.

The polymerization may be of any useful type, e.g. polycondensation, polyaddition or especially chain (especially radical) polymerization.

In the first step an uncharged polymerizably functionalized precursor of a charged dye radical ("Copolymerizable Precursor") is preferably homogenously dissolved in the bulk monomer or monomer (if present with one or more comonomers) mixture. This oil solution is then emulsified in an aqueous phase in the presence of surface active agents (emulsifying aids) like surfactants (such as those given below) to form an emulsion with (preferably homodisperse) oil droplets for an emulsion polymerisation (see e.g. J. W. Vanderhoff, J. Polym. Sci.: Polym. Symp. 1985, 72, 161-198; P. J. Blythe et al., Macromol. Symp. 2000, 150, 179-186, incorporated by reference herein especially with regard to the emulsifying aids and emulsion polymerization compositions and conditions). Alternatively or in addition, the Copolymerizable Precursor can be added to a pre-formed emulsion of the monomer mixture and then mixed in. The obtained mixture is then polymerized (after initiation, e.g. by addition of an initiator) to give uncharged particles, preferably with diameters in the nanometer range (e.g. from 20 to 800 nm), derivatised with covalently bound uncharged organic dye radicals precursors (partial components or component precursors for such a charged dye radical), substantially homogeneously distributed in the particle matrix.

In a second step (which may comprise one or more, e.g. one or two, parallel or consecutive reactions), the complete dye radical and (simultaneously (preferred) or in a subsequent step) the corresponding charge are produced on the particle, preferably in one step, by reacting one or more complementary organic precursors ("Chargeless Educt(s)") of the charged dye radical to form the corresponding charged dye-carrying particles using the particles obtainable (meaning preferably "obtained" wherever used) in the first step, thus effecting both the formation of the final color by completion of the dye radical (preferably including formation of its chromophore) and the introduction of a positive or negative charge on the dye radical. Where desired, further modifications may be made (e.g. in order to induce a bathochromic shift).

In addition, if desired, in order to tune the electrophoretic mobility of the functionalized particles, and to control the conductivity of the dispersion (see above), counter ions of the particle may be exchanged against more appropriate ones in an additional final step by customary methods mentioned below. Appropriate, bulky, non-nucleophilic counter ions may be chosen from but are not restricted to the following enumeration: $Cl^-$, $Br^-$, $J^-$, $RCOO^-$ (R=H, branched or linear alkyl, wherein one or several methylen units may be replaced by dimethyl silyloxy units or methyl by trimethyl silyloxy units, respectively, or (substituted)phenyl), $BF_4^-$, $PF_6^-$, $SbCl_6^-$, $SbF_6^-$, $ClO_4^-$, $BrO_4^-$, $JO_4^-$, $B(OR)_4^-$, $BR_4^-$ (R=branched or linear alkyl or (substituted)phenyl), $R-SO_3^-$ (branched or linear alkyl or (substituted)phenyl), $RR'P(O)O^-$ (R, R'=independently branched or linear alkyl or (substituted)phenyl), $ROR'OP(O)O^-$ (R, R'=independently branched or linear alkyl or (substituted)phenyl), etc.

The polymerisation can preferably be performed under an atmosphere of inert gas like nitrogen or argon, especially avoiding the presence of oxygen.

The polymerisation temperature is, for example, chosen in a range of from 0° C. to 130° C., in a possible preferred embodiment from 40° C. to 120° C., e.g. more preferably between 50° C. to 80° C., preferably taking into account the decomposition temperature of the applied initiators and avoiding undesired decomposition.

"Emulsions" are per se known in the art, as are methods for forming them. Emulsions are, by definition, "droplets" dispersed in a "continuous phase". According to the present invention, the emulsion contains a mixture ("polymerization mixture" hereinafter) of monomers, possibly comonomers and (admixed directly to the comonomer/monomer phase and/or after this has been emulsified) Copolymerizable Precursor. This polymerization mixture can be present throughout the emulsion, though typically is present mostly in the droplets. The emulsion useful according to the invention is thus preferably an oil (which means a poorly water-soluble material) in water (o/w) emulsion (organic phase in the droplets, aqueous continuous phase).

Accordingly, the droplets of the emulsion will contain the polymerization mixture, and may optionally contain one or more solvents and solvent additives, as are defined below.

The mixture may be conveniently combined with one or more non-polar, amphiphilic or polar solvents, or the mixture may, itself, be the droplets.

If required, any solid materials present can be dissolved by ultrasound or heating (homogenisation). Also the emulsifying can take place by stirring, shaking, and/or homogenisation as just described.

The continuous phase and the droplets of the emulsion can contain a wide variety of solvents, and will be chosen e.g. according to the solubility characteristics.

The continuous phase may further contain an agent for adjusting the solubility of the substances in the continuous phase and/or the freezing point of the continuous phase. In such cases where the continuous phase is water, such agent is conveniently a water soluble inorganic salt such as $CaCl_2$, $NaCl$, $KCl$, $MgCl_2$, $AlCl_3$, $CaCO_3$, $Na_2CO_3$, $K_2CO_3$, $KHCO_3$ or $NaHCO_3$ or a water-miscible organic liquid such as an alcohol, ether, ketone, ester, lactone, dimethylsulfoxide (DMSO) and acetonitrile. Water-miscible organic liquids are preferred.

Below is set forth a list of suitable solvents and solvent additives which may be used in the droplets and the continuous phase.

I. Non-polar, lipophilic solvents and additives having a water solubility of <5% v/v at room temperature (hereinafter "r.t."), which include:

1. alkanes such as n-, iso- or branched alkanes, including polyethylenes, polypropylenes, cycloalkanes (e.g. cyclopentane, cyclohexane) and the like;

2. aromatics such as unsubstituted aromatics (e.g. benzene, naphthalene), substituted aromatics such as alkylated aromatics (e.g. toluene, xylene, higher alkylated benzenes, alkylated naphthalenes), heterosubstituted aromatics such as halogenated (e.g. chlorobenzene, hexafluorobenzene) and/or nitrated (e.g. nitrobenzene), or heteroaromatics such as pyridine;

3. mineral-, synthetic-, crop- and/or silicone oils (e.g. Castor oil, methyloleate, polysiloxane);

4. halogenated hydrocarbons such as $CH_2Cl_2$, $CHCl_3$, $CCl_4$, trichloroethane, trichloroethene, polyvinylchloride;

5. $CS_2$, $CO_2$;

6. ethers such as n-, iso- or branched ether, preferably with total C number≥4 (e.g. diethylether, tert-butyl methylether (TBME);

7. aldehydes such as n-, iso- or branched aldehydes, preferably with total C≥4;

8. ketones, preferably with total C≥5 e.g. 2-hexanone, methyl-t-butylketone) or cycloketones with preferably C≥5;

9. esters such as n-, iso- or branched esters, preferably with total C≥5, diesters such as di(-methyl-, -isodecyl-, -isoundecyl-, -isotridecyl-) phthalate, diesters of carbonic acid, triesters such as oils and fats, and polyesters;

10. amides such as N-,N-dimethyl laurylamide, and polyamides;

11. Lactames such as (N-octyl-, N-dodecyl-)pyrrolidone;

12. alkanoles, alkenoles, alkinoles, aromatic and cyclic alcohols, preferably with total C≥5 (e.g. 2-hexanol, cyclohexanol, benzylalcohol);

13. primary, secondary and tertiary amines e.g. n-, iso- or branched such amines, preferably with total C≥6 (e.g. dodecylamine);

II. amphiphilic solvents, soluble in both non-polar, lipophilic and polar, hydrophilic phases with a water solubility of >5% v/v at r.t. and a solubility of >5% v/v at r.t. in methyloleate, including:

1. ethers such as tetrahydrofurane (THF), polyethers such as dimethoxyethane (DME), dioxane, trioxane, polyethylene glycol (PEG), polypropylene glycol (PPG);

2. alcohols such as n-, iso-, cyclo- or branched alcohols, preferably with total C≤5 (e.g. isopropanol, isobutanol, cyclobutanol, cyclopentanol), aromatic alcohols such as phenol, diols such as propyleneglycol, butanediol or polyols;

3. aminoalcohols such as ethanolamine, diethanolamine, triethanolamine;

4. primary, secondary and tertiary amines such as n-, iso- or branched ones, preferably with total C<7 (aniline, cyclohexylamine, pyridine, morpholine), polyamines;

5. aldehydes with total C<3 (e.g. formaldehyde, acetaldehyde);

6. ketones such as n-, iso- or branched ketones, or cyclic ketones, with total C≤6 (acetone, 2-butanone, cyclohexanone);

7. esters such as n-, iso- or branched esters, preferably with total C<4, di-, triesters ethylenglycoldiacetate, dimethyladipiate, dimethylglutamate, dimethylsuccinate, trimethylphosphate);

8. lactones such as γ-butyrolactone;

9. amides such as formamide, dimethyl formamide (DMF), acetamide;

10. lactames such as (N-methyl-, N-ethyl-, N-isopropyl-, N-hydroxyethyl-) pyrrolidone;

11. other heterocyclic compounds such as imidazoles, triazoles;

12. carbonic acids such as n-, iso- or branched carbonic acids, preferably with total C<5.

III polar, hydrophilic solvents or solvent additives with a solubility of <5% v/v in methyloleate include:

1. water;
2. DMSO;
3. Di- or polycarbonic acids (e.g. oxalic acid, tartaric acid);
4. selected di- or polyalcohols (e.g. ethanediol, glycerine, PVA);
5. amino acids;
6. sugars.

In cases where the emulsion is a microemulsion, typically also one or more alcohols can be added to the dispersion. Such alcohols include iso-butanol, 1-butanol, 2-butanol, 2-pentanol, 2-hexanol, 2-octanol, cyclopentanol, cyclohexanol and benzylalcohol. These alcohols will be present in the dispersion in an amount ranging from 2-80% by weight, preferably 3-50%, more preferably 5-40%.

The emulsion according to the present invention will normally contain one or more surface active agents, i.e. solubilizers, surfactants and/or dispersants which assist in forming and stabilizing the emulsion droplets. Such solubilizers, surfactants and/or dispersants will be chosen according to the nature of the emulsion, and can be nonionic, anionic, cationic or amphoteric. The surface active agent will normally be present in an amount ranging from 0.1 to 99% by weight, preferably 0.1 to 10 weight % with respect to the total weight of monomers, comonomers and uncharged precursor. Below is set forth a non-exhaustive list of suitable solubilizers, surfactants and dispersants:

I. Non-ionic surfactants including ethoxylated or ethoxylated and propoxylated [alkylphenols, di- or tristyrylphenols, oils (e.g. castor oils), oleic acids, fatty or synthetic alcohols, fatty or synthetic amines or amides]; ethoxylated or ethoxylated and propoxylated sugar esters (e.g. sorbitan monolaurate, POP-POE glycerol sorbitan fatty esters) of e.g. (ethoxylated) oleic or fatty acids; sucroglycerides; ethoxylated sugar ethers (e.g. alkyl polyglucoside); silicone surfactants (e.g. silicone glycol copolymers with polyoxyalkylene polymethylsiloxane units;

II. anionic surfactants including alkylarene sulphonates (eg. dodecylbenzenesulfonates); alkyldiphenyl ether sulfonate salts; alkyl sulfonates, sulfosuccinates (eg. dioctyl sulfosuccinates); (ethoxylated) alkyl sulfates (e.g. lauryl sulfates, lauryl ether sulphates); (fluorinated) mono-, di- and/or triesters of phosphorus acid, e.g. alkyl phosphates, and/or salts thereof (as alcohols may be used e.g. (ethoxylated) alkyl-phenols, alkanols with 8<total C<18, 2-ethylhexyl- or lauryl alcohol); ethoxylated phenol sulfates;

III. cationic surfactants including protonated (ethoxylated) primary, sec., or tert. amines or diamines; (ethoxylated) quarternary ammonium salts (e.g. trimethyl oleyl ammonium chloride);

IV. amphoteric surfactants including N-coco-beta-aminobutyric acid; or amine oxides, such as lauryl dimethyl amine oxide;

V. polymeric surfactants like polyethylene oxide/polypropylene oxide copolymers; acrylic polymers; polyvinyl alcohol; modified polyesters; polyoxyethylene alkyl ethers; starch; graft polymers;

VI. solubilizers including naphthalene sulfonate; cumol sulfonate;

VII. dispersants including phenylsulfonates; (alkyl-) naphthalene sulfonates; polycarboxylates; acrylic polymers; maleic acid/acrylic acid copolymers; maleic acid/methyl vinyl ether copolymers; polyvinyl pyrrolidone; polyvinyl pyrrolidone/polystyrene copolymers; (ethoxylated) lignin sulfonates.

The aqueous phase of the emulsion conveniently comprises from about 98% to 60% by total weight of the reaction mixture (emulsion). Preferably, it is in the range of 95% to 80%.

It may contain an appropriate buffer component, if necessary, e. g. salts of weak acids, alone or in mixture with weak acids, such as potassium carbonate, sodium carbonate, sodium phosphates or the like, or acids in combination with nitrogen bases, such as TRIS and HCl, which can be present e.g. in amounts from 0.01 to 5%, preferably in low amounts from 0.01% to 1.0% by weight of the aqueous phase. The pH of the aqueous phase may be in the range from 2 to 12, preferably in the range from 5 to 8.

Preferred emulsion polymerisation procedures include traditional emulsion polymerisation, mini emulsion polymerisation, micro emulsion polymerization, suspension polymerization and seeded emulsion polymerisation. Most preferred is micro emulsion polymerization which leads to particles of especially appropriate size (in the nanometer range) and with other advantageous properties, such as (semi-) transparency in dispersion.

Some of the features of these procedures can be deduced from the following table which provides examples for (preferred) typical properties of various types of emulsion polymerization (see also WO 00/53640):

| Property | Traditional Emulsion | Mini Emulsion | Micro Emulsion | Suspension |
|---|---|---|---|---|
| Place of polymerization | Particles | Droplets | Particles | Droplets |
| Distribution of Monomer | Droplets and particles | Droplets | Particles | Droplets |
| Distribution of polymer | Particles | Droplets | Particles | Droplets |
| Monomer aqueous solubility | Moderate to high | Low to moderate | Moderate | Low to moderate |
| Importance of agitation | Moderate to low | High (in the beginning) | Low | High |
| Example for typical obtainable particle size | 10 to 200 nm | 50 to 500 nm | 5 to 200, e.g. 10 to 100 nm | 500 to 5000 nm |
| Typical particle size distribution | Narrow | Broad | Narrow | Broad |

-continued

| Property | Traditional Emulsion | Mini Emulsion | Micro Emulsion | Suspension |
|---|---|---|---|---|
| Example for typical amount of surfactant (relative to monomer) | 0 to 5% | 0.1 to 10% | about 100% | 0 to 5% |
| Thermodynamic stability of particles/droplets before polymerisazion | Not stable | Not stable | Stable | Not stable |
| Example for typical maximum solids content | 50% | 20% | <10% | 40 to 50% |

The droplets typically vary in diameter from less than 500 nm, e.g. 5 to 500, preferably 5 to 200 nm, in which case the droplets are "microdroplets", and the emulsions are "microemulsions", to 0.2-100 mm, e.g. 0.5-50 mm, in which case the droplets and emulsions are simply called "droplets" and "emulsions". For the sake of simplicity, the terms "droplets" and "emulsions" as used herein also encompass microdroplets and microemulsions. The droplet size, at the same time, is the (approximate) size of the resulting (uncharged, that is not comprising dissociated ionic groups) polymer particles.

In the case of seeded microemulsions, it is possible to achieve a less homogenous (e.g. surface near) distribution of the chromophore in the resulting particle matrices.

Initiation may take place by any customary means, e.g. irradiation, addition of initiators for anionic or cationic polymerization or especially of a radical initiator.

The radical initiator may be any water soluble or oil soluble free radical producing compounds well known in the art which is capable of starting a chain reaction under addition for polymerization of molecules with olefinic double bonds. The preferred radical initiators are of the nitroxide type, of the organic or inorganic peroxide type and of the diazo type, examples are organic peroxides, such as diacyl peroxides, e.g. benzoyl peroxide or bis(4-chlorobenzoyl)peroxide, ketonperoxides or alkylperesters, such as tert-butylperbenzoate, inorganic peroxides, such as potassium peroxodisulfate, perborates, 4,4'-azobis-(4-cyan-valeric acid), 2,2'-azobis-(2-methyl-butyronitril) or 2,2'-azobis-(2-methyl-propionitril), or mixtures of two or more such initiators. The amount of initiator present in the reaction mixture is preferably in the range from about 0.0005 to 5% by weight, based upon the total weight of monomers and their reactivities.

The (of course preferably also charge neutral) polymerizable monomers that form the basis for the particle matrix (particle scaffold, polymer particles or polymer particle scaffold) may be chosen from various vinyl compounds or mixtures thereof known in the art. Examples for preferred monomers are styrene, ((di)-$C_1$-$C_4$-alkyl) styrenes, $C_1$-$C_{18}$alkyl (meth-)acrylates, vinyl-$C_1$-$C_{18}$alkyl ethers, vinyl-$C_1$-$C_{18}$ alkyl ketones and/or vinyl-$C_1$-$C_{18}$ esters.

The polymerization mixture may contain neutral cross linking components (as comonomers), if desired or useful. Examples of cross linkers, which are well know in the art, include e. g. divinylbenzene, divinylnaphthalene, di-(meth-)acrylate esters of diols, and/or divinyl ethers, or mixtures of two or more such compounds. They preferably have to be chosen so that they are compatible with the selected monomer and the selected uncharged functionalized precursor of a charged chromophore. The amount present in the polymerization mixture may vary between 1% to 80%, preferably 5% to 50% and most preferably 10% to 30% by weight, based on the total amount of the polymerizable components.

The amount of Copolymerizable Precursor (of the chromophore) may in a preferred example be in the range from 0.01 wt. % to 25 wt. %, preferably 0.1 wt. % to 18 wt. % and, most preferably, 0.1 wt. % to 15 wt. % with respect to total the amount of polymerrizable components.

"Polymerizably functionalized" means that the uncharged polymerizable precursor of a charged dye radical carries at least (and preferably only) one polymerizable appendix or integrated group (together also designated "olefinic moiety" hereinafter) carrying at least (and preferably only) one ethylenically unsaturated (olefinic, preferably unconjugated) aliphatic moiety, preferably with up to 30, more preferably with 2 to 20 carbon atoms, which is unsubstituted or substituted e.g. by one or more, e.g. up to 3, (at least under the given reaction conditions, especially the pH) uncharged substituents.

Substituents, wherever mentioned and unless otherwise specified, are usually selected from the group consisting of alkyl, hydroxyl, alkoxy, phenyl, naphthyl, phenylalkyl, naphthylalkyl, amino, mono- or di-$C_1$-$C_{20}$-alkylamino, nitro, halogen, cyano, carbamoyl and sulfamoyl, where alkyl preferably has 1 to 20 carbon atoms wherever mentioned.

The olefinic moiety is preferably selected from the group consisting of (at least partially) unsaturated $C_1$-$C_{30}$acyl moieties (which may be bound directly or via NH or preferably O), such as acryloyl-, methacryloyl-, cinnamoyl-, maleoyl-, itaconoyl- and/or crotonoyl-, vinyl alkyl- (such as allyl), divinyl alkyl-, vinyl(di, tri, tetra)alkyl-, aryl (e.g. phenyl of naphthyl)-vinyl-, substituted (by charge neutral (uncharged) substituents such as the (at least under the reaction conditions) uncharged substituents just mentioned above, especially $C_1$-$C_{20}$alkyl, $C_1$-$C_{20}$alkoxy, cyano, nitro, $C_1$-$C_{20}$-alkanoyloxy or the like), aryl (e.g. phenyl- or naphthyl)-vinyl-, and the like.

The uncharged polymerizably functionalized precursor of a charged dye radical is preferably an uncharged building block for a charged dye with a chromophore precursor moiety, which radical (especially the chromophore of which) is completed in the second reaction step, and which carries a polymerizable group ("polymerizably functionalized").

The dye radicals are preferably charged moieties including a dye structure (especially a chromophore) that show color. "Color" means that a moiety or a particle derivatized with it absorbs at least more or less selectively within the visible part of the spectrum (wavelengths about 400 to about 800 nm) at preferably one limited wavelength range. The color realized with the eye then corresponds to the respective complementary colour of the absorbed spectral area(s) which results from the rest of the spectrum in the wavelength area between about 400 to about 800 nm.

Preferably, for each type of particle to be made or according to the invention the dye radicals are moieties of any one of the following cationic or anionic dyes bound to the particles directly or via a linker group:

A positively charged methane or polymethin dye, including a cyanine, isocyanine, pseudocyanine, hemicyanine, carbocyanine (e.g. quinocyanine), styryl, zeromethine (apocyanine), mesocyanine, polycarbocyanine, pyocyanine, streptocyanine (including aminoaryleneamine) mono-, di-, tri- or tetraazamethine or especially a phenylogous methin or azamethin, e.g. azacarbocyanine or diazahemicyanine, dye (the phenylogous dyes especially for blue), such as diphenylmethane, a quinone imine especially of the indamine type, a positively charged triarylmethane dye (this term including triarylmethane derivatives), such as a positively charged triphenylmethane or naphthyldiphenylmethane dye, especially triphenylmethane (including derivative) dyes, e.g. of the malachite green type, crystal violet type or the fuchsone type, the acridine type, the azine type, e.g. the phenazine, oxazine, especially phenoxazine (preferred, especially for blue) or thiazine, especially phenothiazine type, the methane- or polymethine azo-dye type or a positively charged pyrylium or flavylium dye (preferred, especially for magenta);

a positively charged anthraquinone dye;
a positively charged perinone dye;
a positively charged naphthalimide dye;
a positively charged quinophthalone dye;
a neutrocyanine dye;
a positively charged nitro dye, especially a naphthol;
a positively charged dye with sulfur or phosphorus as the charge-carrying group, e.g. with a sulfonium, an isothiuronium or a tri(aryl or alkyl)ated phosphonium group;
the reaction product of a monochlorotriazinyl dye with a tertiary amine;
a negatively charged polymethine dye such as an oxonole or a negatively charged phenylogous methin or azamethin dye, e.g. of the or phthalein type, the (thio)xanthene or heterophthalein type;
a tetrazolium dye; and
a positively charged azo dye, e.g. with onium group, e.g. with onium groups not directly coupled to the azo group, such as cationic azo dyes, e.g. containing the positive charge at a trialkylammonium or cycloammonium group, or with cycloammonium groups attached to an azo group by a carbon attached to the ring system, e.g. having one nitrogen atom as the only ring atom, a 1,2- or 1,3-diazole or hydrogenated 1,2- or 1,3-diazole, having three nitrogen atoms as the only ring atoms or a (benzo)thiazole or a hydrogenated (benzo)thiazole, e.g. diazahemicyanine dye.

Most preferred as dye radicals are moieties of dyes selected from the following group:

Triarylmethane dyes comprising (with representation in only one of the possible mesomeric forms) a group of the formula (A),

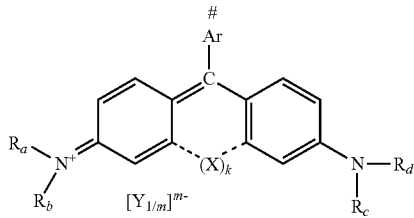

(A)

wherein
Ar is $C_6$-$C_{14}$aryl, especially phenyl or naphthyl, and is substituted with N-mono- or N,N-di-($C_1$-$C_{45}$-alkyl-, $C_2$-$C_{45}$-alkenyl, phenyl-$C_1$-$C_{45}$-alkyl and/or phenyl-$C_2$-$C_{45}$-alkenyl)-amino, especially in p-position to the bond binding R to the rest of the molecule;
X is absent (k=0) or present (k=1) and is O, S or $NR_e$;
$R_a$, $R_b$, $R_c$ and $R_d$ are independently selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl)$_2$ and/or $Si(C_1$-$C_{45}$ (preferably $C_1$-$C_7$)-alkyl)$_2$-O;
or one of $R_a$ and $R_b$ and/or one of $R_c$ and $R_d$ is aryl or aryl-$C_1$-$C_7$-alkyl, especially phenyl, naphthyl, phenyl-$C_1$-$C_7$-alkyl or naphthyl-$C_1$-$C_7$-alkyl which is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl)$_2$ and/or $Si(C_1$-$C_{45}$ (preferably $C_1$-$C_7$)-alkyl)$_2$-O, while the other of $R_a$ and $R_b$ and/or of $R_c$ and $R_d$ is as defined before;
$R_e$ is hydrogen, $C_1$-$C_{45}$ (preferably $C_1$-$C_7$)-alkyl, phenyl, naphthyl, phenyl-$C_1$-$C_{45}$ (preferably $C_1$-$C_7$)-alkyl or phenyl-$C_1$-$C_{45}$ (preferably $C_1$-$C_7$)-alkyl;
Y is an anion and
m is 1, 2, 3 or 4;
preferably a blue dye of formula (A), more preferably of the formula (A*)

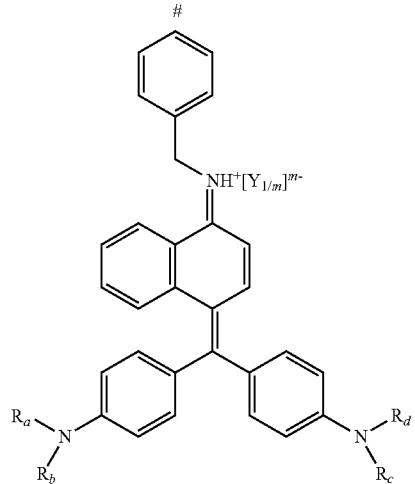

(A*)

wherein Y, m, $R_a$, $R_b$, $R_c$ and $R_d$ are as defined for a compound of the formula A (preferably with $R_a$, $R_b$, $R_c$ and $R_d$ each being $C_1$-$C_{45}$-alkyl);
pyrylium dyes of the formula (B),

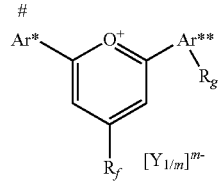

(B)

wherein Ar* and Ar**, independently of the other, are $C_6$-$C_{14}$aryl, especially phenyl or naphthyl;
$R_f$ is hydrogen or $C_1$-$C_{45}$alkyl wherein one or more hydrogen atoms can be replaced with fluorine and which is linear or branched wherein one or more $CH_2$ groups may be replaced with O, $Si(C_1$-$C_7$-alkyl)$_2$ and/or $Si(C_1$-$C_7$-alkyl)$_2$-O; or (preferably) $R_f$ is phenyl or naphthyl that is unsubstituted or substituted by $C_1$-$C_{45}$alkyl wherein one or more hydrogen atoms can be replaced with fluorine and which is linear or branched wherein one or more $CH_2$ groups may be replaced with O, Si(C$_1$-C$_{45}$ (preferably C$_1$-C$_7$)-alkyl)$_2$ and/or Si(C$_1$-C$_{45}$ (preferably C$_1$-C$_7$)-alkyl)$_2$-O, or preferably by NK$_1$K$_2$ wherein K$_1$ and K$_2$ are independently from each other selected from C$_1$-C$_{45}$alkyl wherein one or more hydrogen atoms can be replaced with fluorine and which is linear or branched wherein one or more CH$_2$ groups other than those binding to N may be replaced with O, Si(C$_1$-C$_{45}$ (preferably C$_1$-C$_7$)-alkyl)$_2$ and/or Si(C$_1$-C$_{45}$ (preferably C$_1$-C$_7$)-alkyl)$_2$-O; or one of K$_1$ and K$_2$ is aryl or aryl-C$_1$-C$_{45}$ (preferably C$_1$-C$_7$)-alkyl, especially phenyl, naphthyl, phenyl-C$_1$-C$_{45}$ (preferably C$_1$-C$_7$)-alkyl or naphthyl-C$_1$-C$_{45}$ (preferably C$_1$-C$_7$)-alkyl, wherein aryl is unsubstituted or substituted with C$_1$-C$_{45}$alkyl wherein one or more hydrogen atoms can be replaced with fluorine and which is linear or branched wherein one or more CH$_2$ groups other than those binding to N may be replaced with O, Si(C$_1$-C$_{45}$ (preferably C$_1$-C$_7$)-alkyl)$_2$ and/or Si(C$_1$-C$_{45}$ (preferably C$_1$-C$_7$)-alkyl)$_2$-O;

R$_g$ is, independently from R$_f$, selected from the moieties mentioned for R$_f$, especially hydrogen;

Y is an anion and m is 1, 2, 3 or 4;

preferably a magenta dye of formula (B), especially one of the formula (B*)

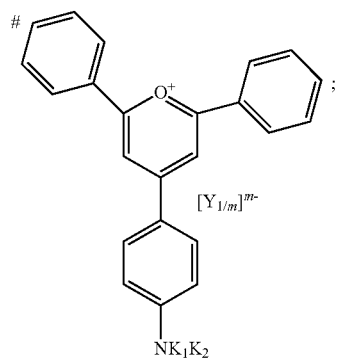

(B*)

wherein K$_1$ and K$_2$ are, independently of each other, are C$_1$-C$_{45}$-alkyl or one of them is C$_1$-C$_{45}$-alkyl wherein one or more CH$_2$ groups may be replaced with O, Si(C$_1$-C$_{45}$ (preferably C$_1$-C$_7$)-alkyl)$_2$ and/or Si(C$_1$-C$_{45}$ (preferably C$_1$-C$_7$)-alkyl)$_2$-O, and the other is phenyl, naphthyl, phenyl-C$_1$-C$_{45}$ (preferably C$_1$-C$_7$)-alkyl or naphthyl-C$_1$-C$_{45}$ (preferably C$_1$-C$_7$)-alkyl;

and pyrylium dyes of the formula (C),

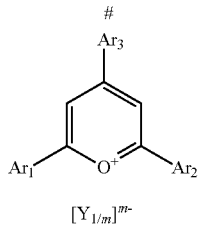

(C)

wherein Ar$_1$ and Ar$_2$, independently of the other, are C$_6$-C$_{14}$aryl, especially phenyl or naphthyl;

Ar$_3$ is are C$_6$-C$_{14}$aryl, especially phenyl or naphthyl, and is substituted with C$_1$-C$_{45}$ (preferably C$_3$-C$_7$)-alkanoyloxy;

Y is an anion and m is 1, 2, 3 or 4;

preferably a yellow dye of formula (C), such as especially a dye of the formula C*

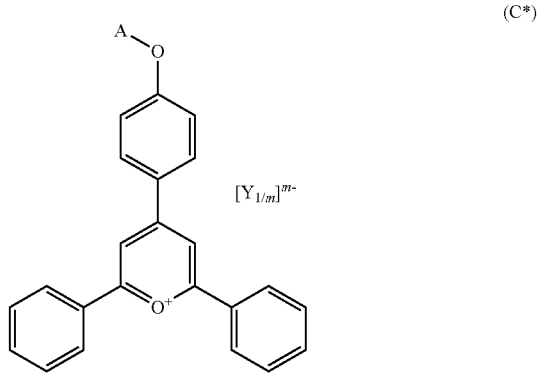

(C*)

wherein A is C$_3$-C$_7$-alkanoyl and Y and m are as defined for a compound of the formula (C).

In formula (C), preferably Ar$_1$ and Ar$_2$ are identical.

When bound to the particles, a linker group is present, or a radical of the dye (meaning a group where one hydrogen of the complete dye is missing and instead a bond to the rest of the polymer is present) is bound directly to the particle matrix. Preferred positions (of which usually only one is made use of) for such binding bonds or linkers (e.g. derived from copolymerized vinyl-substituted substituents or N-mono- or N,N-Di-(C$_1$-C$_{45}$-alkyl-, C$_2$-C$_{45}$-alkenyl, phenyl-C$_1$-C$_{45}$-alkyl or phenyl-C$_2$-C$_{45}$-alkenyl)-amino carrying such substituents on a carbon atom, from (meth)acryloyl or from (meth)acryloyloxy) are indicated by the sign "#" in formula A, A*, B, B* and C or the moiety A in formula C*, or in formulae D* and E* below.

A preferred yellow dye is of the formula D*

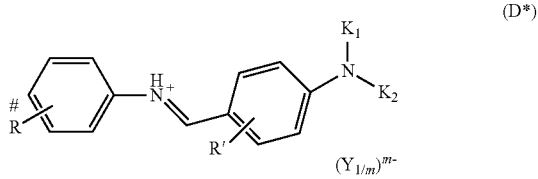

(D*)

or is a pyrylium dye of the formula (C); and preferred blue dyes include those of the formula E*

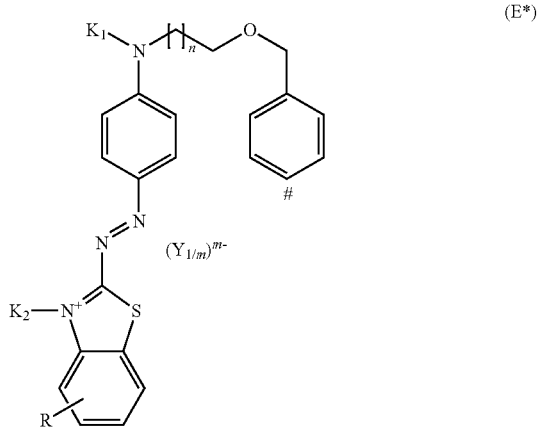

(E*)

and pyrylium dyes of the formula (C);

wherein n is 1 or larger, such as a number from the range 1-20, especially 1-7;

R and R' independently are K$_3$ or OK$_3$, or especially hydrogen;

$K_1$, $K_2$ and $K_3$, independently of each other, are selected from $C_1$-$C_{45}$-alkyl; $C_1$-$C_{45}$-alkyl wherein one or more $CH_2$ groups are replaced by O, $Si(C_1$-$C_{45}$ (preferably $C_1$-$C_7$)-alkyl)$_2$ and/or $Si(C_1$-$C_{45}$ (preferably $C_1$-$C_7$)-alkyl)$_2$-O; phenyl; naphthyl; phenyl-$C_1$-$C_{45}$ (preferably $C_1$-$C_7$)-alkyl; naphthyl-$C_1$-$C_{45}$ (preferably $C_1$-$C_7$)-alkyl; preferably are $C_1$-$C_{45}$-alkyl, or one of them is $C_1$-$C_{45}$-alkyl wherein one or more $CH_2$ groups may be replaced with O, $Si(C_1$-$C_{45}$ (preferably $C_1$-$C_7$)-alkyl)$_2$ and/or $Si(C_1$-$C_{45}$ (preferably $C_1$-$C_7$)-alkyl)$_2$-O, and the other is phenyl, naphthyl, phenyl-$C_1$-$C_{45}$ (preferably $C_1$-$C_7$)-alkyl or naphthyl-$C_1$-$C_{45}$ (preferably $C_1$-$C_7$)-alkyl.

Preferably the dye (and thus the corresponding products of the first reaction step of an emulsion polymerization according to the invention) with a covalently bound Copolymerizable Precursor) is bound via a bond (that is, "polymerizably functionalized" means that the Copolymerizable Precursor itself has a polymerizable function which allows to take part in the copolymerization, especially an olefinic, such as vinyl group, e.g. as vinyl, allyl, methacryloyloxy or acryloyloxy or other double bond carrying moiety that takes part in the copolymerization reaction, more generally leading to an alkylene, alkylenoxy, alkylenylimino, arylalkylene, arylalkyleneoxy or alkylencarbonyloxy moiety, e.g. an 1,2-ethylene or 1,2,2-ethantriyl, trimethylene or propantriyl, (o-, m- or p-(1, 2-ethylene or trimethylen)-phenylen or -phenylenmethylene or in each case a trivalent radical thereof, (o-, m- or p-(1,2-ethylene or trimethylen)-phenylenoxy or -phenylenmethyleneoxy or in each case a trivalent radical thereof, 1,3-bound dimethylenecarbonyloxy or 1,3-bound (methyl)methylencarbonyloxy bridge) or in each case a trivalent radical thereof; or via a linker, which is preferably an alkylene, alkanetriyl, alkylenoxy or a trivalent derivative thereof, arylalkylene or a trivalent derivative thereof, arylalkyleneoxy or a trivalent derivative thereof, or alkylencarbonyloxy or a trivalent derivative thereof, as bridge, e.g. an 1,2-ethylene, 1,2,2-ethantriyl, trimethylene, porpantriyl, (o-, m- or p-(1,2-ethylene or trimethylen)-phenylen or -phenylenmethylene, (o-, m- or p-(1,2-ethylene or trimethylen)-phenylenoxy or -phenylenmethyleneoxy or in each case a trivalent radical thereof, 1,3-bound dimethylenecarbonyloxy or in each case a trivalent radical thereof or 1,3-bound (methyl)methylencarbonyloxy or in each case a trivalent radical thereof, as bridge (that is, "polymerizably functionalized" means that the Copolymerizable Precursor itself carries a moiety (substituent, polymerizable function) which allows to take part in the copolymerization, especially an olefinic, such as vinyl, e.g. as vinyl, allyl or methacryloyloxy or acryloyloxy, or in a broader sense other double bond carrying moiety that takes part in the copolymerization reaction, which moiety is directly bound or bound via a heteroatom, especially O or NH, to the rest of the Copolymerizable Precursor). Where ethylene or other bivalent radicals are mentioned, these are terminally bound at chains that are products of the polymerization (bound at one side to the polymer scaffold and carrying a hydrogen at the other carbon of the precursor double bond as polymerizable function), where ethantriyl or other trivalent radicals are mentioned, they are non-terminal (integral within the polymer scaffold chains). Preferred is a vinyl moiety as polymerizable function that is bound to a substituent N-mono- or N,N-di-($C_1$-$C_{45}$-alkyl-, $C_2$-$C_{45}$-alkenyl, phenyl-$C_1$-$C_{45}$-alkyl and/or phenyl-$C_2$-$C_{45}$-alkenyl)-amino of Ar; Ar*, Ar**; or $Ar_1$, $Ar_2$ or $Ar_3$ in formula A; B; or C, respectively, or a vinyl, (meth)acryloyl or (meth)acryloyloxy moiety.

Exemplary for some of the possible covalently bound charged dyes, in the following list some possible Copolymerizable Precursors (including polymerizably functionalized groups, that is, which in addition to the dyes mentioned carry a polymerizably functionalizing group) and Chargeless Educts as well as reaction conditions leading to the respective dyes are mentioned (note that usually any of the starting materials mentioned may be the Copolymerizable Precursor of the Chargeless Educt, only the former being copolymerizably functionalized). Further Copolymerizable Precursors and Chargeless Educts can be deduced under "Synthesis of the dyes/dye radicals", with the proviso that the starting materials mentioned there as Copolymerizable Precursors are polymerizably functionalized (=comprise or carry at least one polymerizable functional group).

A preferred Copolymerizable Precursor for a radical of a dye of the formula (A) mentioned above, including the olefinic moiety for forming the linker, is one of the formula (AI)

(AI)

wherein Ar is as defined for a compound of the formula A and PG is a polymerizable functional group as defined above, especially vinyl, allyl, acryloyloxy or methacryloyloxy, which is preferably bound directly to Ar or (preferably terminally or in p-position) to a carbon of a N-mono- or N,N-di-($C_1$-$C_{45}$ (preferably $C_1$-$C_7$)-alkyl-, $C_2$-$C_{45}$ (preferably $C_2$-$C_7$)-alkenyl, phenyl-$C_1$-$C_{45}$ (preferably $C_1$-$C_7$)-alkyl and/or phenyl-$C_2$-$C_{45}$ (preferably $C_2$-$C_7$)-alkenyl)-amino substituent of Ar.

A corresponding preferred Chargeless Educt for forming the dye of the formula (A) or the corresponding radical, respectively, is a benzophenone compound of the formula (AII),

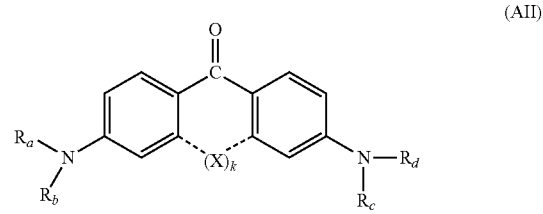

(AII)

wherein X, Y, $R_a$, $R_b$, $R_c$, $R_d$, m and k are as defined for a compound of the formula A.

A preferred Copolymerizable Precursor for a radical of a dye of the formula (B) mentioned above, including the olefinic moiety for forming the linker, is a 1,5-diketone of the formula (BI)

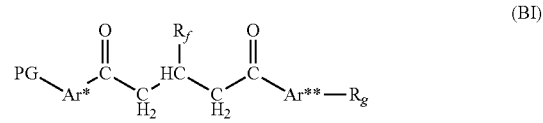

(BI)

wherein Ar*, Ar, $R_f$ and $R_g$ are as defined above for a compound of the formula B and PG is a polymerizable functional group as defined above, especially vinyl, allyl, acryloyloxy or methacryloyloxy (preferably A and Ar** are p-phenylene).

In the second step, the compound is then cyclized (in the same or a different charge, that is with or without isolating the intermediate) to the corresponding pyrylium compound of the formula (B) bound to the particle in the presence of a Lewis acids, such as perchloric acid or acetic acid and boron trifluoro-etherate, and an oxidizing agent, e.g. oxygen or an inorganic or organic peroxide, such as hydrogen peroxide, a peracid or an oxidizing (e.g. $Fe^{3-}$) salt (that is, in this case the Chargeless Educt are the particle-bound moieties of the formula

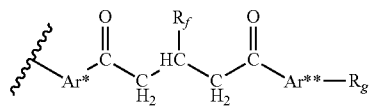

themselves, wherein Ar*, Ar**, $R_f$ (which is, however, more preferably hydrogen) and $R_g$ are as defined above for a compound of the formula B and the waved line indicates the bond through which the moiety is bound via a linker to the particle).

Especially in order to strengthen the color (that is, to cause a bathochromic shift), this product can then, if $R_f$ is hydrogen, in a further step be coupled to a compound of the formula BII, $$HR_f^* \tag{BII}$$

wherein $R_f^*$ is phenyl or naphthyl that is unsubstituted or substituted by $C_1$-$C_{45}$alkyl wherein one or more hydrogen atoms can be replaced with fluorine and which is linear or branched wherein one or more $CH_2$ groups may be replaced with O, $Si(C_1$-$C_{45}$ (preferably $C_1$-$C_7$)-alkyl$)_2$ and/or $Si(C_1$-$C_{45}$ (preferably $C_1$-$C_7$)-alkyl$)_2$-O, or preferably by $NK_1K_2$ wherein $K_1$ and $K_2$ are independently from each other selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl$)_2$ and/or $Si(C_1$-$C_{45}$ (preferably $C_1$-$C_7$)-alkyl$)_2$-O; or one of $K_1$ and $K_2$ is aryl or aryl-$C_1$-$C_{45}$ (preferably $C_1$-$C_7$)-alkyl, especially phenyl, naphthyl, phenyl-$C_1$-$C_{45}$ (preferably $C_1$-$C_7$)-alkyl or naphthyl-$C_1$-$C_{45}$ (preferably $C_1$-$C_7$)-alkyl, wherein aryl is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl$)_2$ and/or $Si(C_1$-$C_{45}$ (preferably $C_1$-$C_7$)-alkyl$)_2$-O. Due to the electrophilic nature of the pyrylium cation, this reaction can take place spontaneously, e.g. in an appropriate aprotic solvent, such as an (e.g. cyclic or aliphatic) ether, a halogen-substituted hydrocarbon or a hydrocarbon, e.g. toluene, at temperatures in the range from e.g. 0° C. to the reflux temperature of the reaction mixture.

A preferred Copolymerizable Precursor for a radical of a dye of the formula (C) mentioned above, including the olefinic moiety for forming the linker, is diketone of the formula (CI)

$$PG\text{-}Ar^{}\text{—}C(O)CH_2CH_2CH_2C(O)Ar^{}Rg \tag{CI}$$

wherein Ar*, A** is as defined above for a compound of the formula C and PG is a polymerizable functional group as defined above, especially vinyl, allyl, acryloyloxy or methacryloyloxy.

General Synthesis of the Dues/Due Radical Precursors:

The following dye synthesis information shows in a broader way possible Copolymerizable Precursors, Chargeless Educts and reaction methods useful in the first and second steps according to the invention.

Polymethin dyes can, for example, generally be synthesized via first coupling a vinylogous formic acid derivative as Copolymerizable Precursor and then reacting with uncharged heterocycles with at least a nitrogen heteroatom, followed e.g. by quaternization (alkylation) of a nitrogen in a heterocycle bound to a chain having an odd number of methin groups.

Many triaminotriarylmethane dyes can be prepared by condensation of Michler's ketone or analogues thereof with different amino substitution with aromatic amines—usually the ketone has to be activated with phosgene or phosphorus oxychloride forming a areactive chloro intermediate which then reacts with the aromatic amine to form the dye. Alternatively, condensation of Michler's hydrol or an analogue thereof with an aromatic amine gives a leuco compound which is then oxidized to the corresponding dye. Yet alternatively, benzaldehyde derivatives can be treated with 2 molar equivalents of an aniline derivative to give a leuco compound that can then be oxidized to the corresponding dye. Yet alternatively, further nucleophilic substitution of chlorine, sulfonic acid or amino groups by aromatic amines is a common process for producing triarylmethane dyes.

Phenylogous di- and triphenylmethane derivatives can, for example, be obtained via electrophilic substitution of nucleophilic aromates (such as phenol or aniline derivatives) with electrophiles (such as tetrachloromethane, chloroform and phenylogous amid chlorides or carbonyl compounds, such as formaldehyde, phosgene, aromatic aldehydes or ketones).

Quinone imines can, for example, be obtained by oxidative cyclization of 0-substituted quinine imines which can, in preceding reaction steps, be built up from appropriate Copolymerizable Precursors and Chargeless Educts.

Acridine dyes can, for example, be obtained by electrophilic substitution of m-substituted anilines (copolymerized in the first step to a particle) by an aldehyde as Chargeless Educt, the cyclization to a 9,10-dihydroacridine taking place with intramolecular elimination of ammonia, followed by oxidation.

Positively charged azo dyes can, for example, be obtained by azo coupling of components or oxidative coupling for azo dyes with positive charge via uncharged amidrazones and/or uncharged hydrazones followed by oxidation. Coupling of amino precursors, e.g. aminonaphthols, with diazotized aromatic amines and subsequent exhaustive alkylation provide an alternative route useful. Aliphatically linked cyclic ammonium groups can be obtained by reaction of N-ethyl-N-chloroethylaniline, N,N-bis(chloroethyl)aniline or N-ethyl-N-chloroethyl-metoluidine coupled with e.g. 2-chloro-4-nitroaniline, 2,5-dichloro-4-nitroaniline (red), 2-chloro-5-trifluoromethylaniline (yellow), 4-nitro-2-trifluoromethylaniline (red), 2-amino-5-trifluoromethyl-1,3,4-thiadiazole (red), 3-methylmercapto-5-amino-1,2,4-thiadiazole (red), 3-methyl-4-nitro-5-aminoisothiazole (blue-violet), 2-amino-6-chlorobenzothiazole (red) or 3-amino-5-nitro-7-bromobenzisothiazole (blue with a red cast) with pyridine; instead of pyridine, other tertiary nitrogen compounds can be used, e.g. picolines, leading to other dyes.

By reacting a Copolymerizable Precursor containing a haloalkyl (e.g. chloroethyl) or comparable group in the second step with thiourea as Chargeless Educt, cationic charge may be introduced in the form of an isothiuronium residue. To introduce phosphorus as the charge-carrying moiety, Copolymerizable Precursors that carry a haloalkyl group are first bound and then treated with phosphines, such as dimethylphenylphosphine. Reaction of Copolymerizable Precursors carrying a primary amino group with dimethylformamide and an inorganic acid chloride, e.g. phosphoryl chloride, permits introduction of the formamidinium group. A comparable reaction occurs with the trialkylhydrazinium moiety obtained by reacting formyl-substituted (e.g. azo) dyes with dialkyl-hydrazines and subsequent quaternization.

For example and preferably, cationic methane dyes of the following classes can be prepared by binding one of the starting materials (the Copolymerizable Precursor, polymerizably functionalized) in the first step of the emulsion polymerization according to the invention, followed by the reaction with the Chargeless Educt (which also in cases where not explicitly mentioned may change their role, a compound mentioned as Copolymerizable Precursor being also a possible Chargeless Educt and vice versa):

| Dye | Copolymerizable Precursor (to which a polymerizable function e.g. as defined above must be bound in addition) | Chargeless Educt | Remarks |
|---|---|---|---|
| hemicyanine cyclomethine dye | N-heterocyclic carbonyl compound (e.g. 3-phenylpyrazoline) | secondary amine (e.g. N-ethyl-naphtholactam) | |
| hemicyanine cyclomethine dye | secondary amine | N-heterocyclic carbonyl compound | |
| polymethine enamine dyes | aromatic amine (e.g. 2,4-dimethoxyaniline, 4-aminophenol glycol ether, 4-aminoacetanilide, 2-(4-aminophenyl)benzoxazole, -benzothiazoe, -benzimidazole or -benzotriazole; diamines, such as bis(4-aminophenyl)ether, 4,4'-diaminodiphenylsulfone, 4-aminophthalic anhydride dimerized by aliphatic diamines, 2-methyl-2,3-dihydroindoline, 3-phenylpyrazoline) | heterocyclic methylene-ω-aldehyde (for example methyleneindoline-ω-aldehydes, e.g. 1,3,3-trimethyl-2-methyleneindoline-ω-aldehyde; tetrahydrobenzoxazine; tetrahydroquinoxaline) | reaction in acid medium |
| polymethine enamine dyes hemicyanine hydrazone dyes | heterocyclic methylene-ω-aldehyde | aromatic amine | reaction in acid medium |
| methine alkylaryl hydrazone dyes | coupling product of aromatic amine (e.g. 2-nitroaniline or 1-amino-anthraquinone) with methylene derivative of an N-heterocylcle (e.g. 1,3,3-trimethylindole, benzothiazolyl-, benzimidazolyl- or pyrimidyl-acetic acid)); or reaction product of heterocyclic (e.g. pyridine-, quinolidine-, acridine-) aldehyde with an arylhydrazine | alkylating agent, e.g. methylhalogenide, such as methylchloride or dimethylsulfate | quaternization of nitrogen at azo bond |
| methin triazene dye | coupling product of N-heterocyclic amine (e.g. diazotized 2-amnomethoxybenzothiazole) with an N-alkylaniline (e.g. N-methyl-4-nitroaniline) | alkylating agent, e.g. methylhalogenide, such as methylchloride or dimethylsulfate | quaternization of nitrogen at azo bond |
| methin triazene dye in which the terminal nitrogen is cyclically bound zeromethine (apo-cyanine) dye | coupling product of N-comprising heterocyclic diazonium salt with a partially hydrogenated heterocycle | ethylene oxide or analogue | alkylation of nitrogen in N-comprising heterocycle |
| | reaction product of p-toluidine with sulfur; tertiary aromatic amine | alkyl-, e.g. methyl- or ethylsulfate; acridinium iodide of chloride | |
| | secondary or tertiary aromatic amine, e.g. 1-phenyl-3,5,5-trimethylpyrazoline, 2,2,4-trimethyltetrahydroquinoline, indole derivatives | N-heterocycle with 2- or 4-carbonyl groups, e.g. naphtholactam, N-alkyl(e.g. ethyl)-naphtholactam, or condensation product of N-alkyl-naphtholactam and formaldehyde | presence of dehydrating reagents, e.g. phosphorus oxychloride or tin tetrachloride |

-continued

| Dye | Copolymerizable Precursor (to which a polymerizable function e.g. as defined above must be bound in addition) | Chargeless Educt | Remarks |
| --- | --- | --- | --- |
| methin styryl dyes | N-heterocycle bearing an activated methyl group in the 2- or 4-position; γ-picoline; 1,3,3-trimethyl-2-methyleneindoline; | 4-aminobenzaldehyde or derivative, e.g. 4-(N-ethyl-N-benzylamino)-benzaldehyde, 1-ethyl-2,2,4-trimethyl-6-formyltetrahydroquinoline, 4-dimethylaminobenzaldehyde, 4-diethylaminobenzaldehyde, Vilsmeyer formylation products of N-(β-hydroxy-ethyl)anilines (which results in the simultaneous replacement of the hydroxyl group by chloro, which can be replaced with cyano to five the corresponding cyano compounds), e.g. 4-(N-methyl-N-β-chloroethyl-aminobenzaldehyde; carbazole, phenoxazine or tetrahydrobenzoxazine aldehydes; | |
| phenylogous diazadimethine hemicyanine dye | Coupling product of a diazotized N-heterocyclic compound (e.g. 2-amino-6-methoxybenzothiazole, indiline or tetrahydroquinoline derivatives, thiazole, 3-amino-1,2,4-triazole, 3,5-diamino-1,2,4-triazole, 2-amino-5-dialkylamino-1,3,4-thiadiazole, 3-aminopyrazole, imidazole) especially with an amino group in the 2- or 4-position and an aromatic amine (e.g. N,N-dimethyl-aniline, N,N-diethylanilinebutylcyanoethyl-aniline, N,N-dibenzylaniline, N-methyldiphenylamine, arylcarboxylates or aryl carbonates of N-(hydroxyethyl)aniline, 2- or 3-chloro-4-aminoacetanilide) | alkylating agent, e.g. alkylhalogenide or dialkylsulfate or compound with a vinyl group, e.g. acrylic acids, acrylates or especially acrylamide, in acidic medium | |
| zeromethinecyanine dyes | naphtholactam and its N-alkylderivatives, N-alkylpyridones, N-alkylquinolones | indoles | condensation in the presence of acid condensation agents such as phosphorous oxychloride |
| zeromethinecyanine dyes | indoles (e.g. with or without a phenyl group in the 2-position) | naphtholactam and its N-alkylderivatives, N-alkylpyridones, N-alkylquinolones | condensation in the presence of acid condensation agents such as phosphorous oxychloride |
| dimethine cyanine dyes | e.g. 1,3,3-trimethyl-2-methyleneindoline 2-methylindole or 1-methyl-2-phenylindole | 2-methyl-indoline-3-aldehyde 1,3,3-trimethyl-2-methyleneindoline-ω-aldehyde | |
| diazadimethine-cyanine dyes | coupling product of diazotized N-heterocyclic amines (e.g. diazotized 2-aminothiazole, 3-amino-1,2,4-triazole, 3-amino-1-benzyl-1,2,4-triazole, 3-aminopyrazole) in the β-position to the nitrogen of other heterocycles (e.g. 1-methyl-2-phenylindole) | alkylating agent, e.g. alkylhalogenide or dialkylsulfate, e.g. dimethylsulfate | |

Pyrylium dyes can be formed, for example, by cyclocondensation of 1,3-diketones with acetophenone, e.g. in the presence of perchloric acid or boron trifluoride-ether complex, e.g. under conditions as described above for the reaction of compounds of the formulae CI and CII. Alternatively, they can be formed by oxidative and dehydrative cyclisation of 1,5-diketones, see e.g. compound (BI).

In order to prevent electrostatic repulsion during the reaction, the Copolymerizable Precursor and the Chargeless Educt are selected so that are, preferably, more preferably always, charge neutral (carry no charge) and that the charge is then formed during the reaction of these components to the dye molecule, which can be (=if desired is or required) is completed by a subsequent reaction which may, e.g., also introduce the charge, provide a bathochromic shift or the like.

Dye and Charge Forming Step

The charged (cationic or anionic) and complete dye molecule is formed at the neutral prefunctionalized polymer in a second step (which may comprise one or more reactions) with the remaining, dissolved, neutral Chargeless Educt of the final dye radical applying the chemistry appropriate to build the desired dye radical (preferably its chromophore) from those precursors. The chemistry includes condensation reactions, addition reactions, substitution reactions, cyclisation reactions, elimination reactions, cyclo addition reactions, addition-elimination reactions, cascade reactions and redox reactions, including quarternisation (e.g. by alkylation, cycloalkylation or other substitution, or by introduction of the formamidinium group e.g. reacting an amino group with dimethylformamide and an inorganic acid chloride, e.g. phosphorylchloride, or by reacting formyl-substituted (e.g. azo-) dyes with dialkylhydrazines and subsequent quaternization) of nitrogen (either in the polymer bound precursor or the Chargeless Educt) to tetrasubstituted nitrogen (without H directly bound to N). The reaction depends on the precursor chosen and the structure of the desired charged colored dye radical. A positive charge usually resides on a C-, N-, O-, S- or P-atom or corresponding systems conjugated by double or triple bonds. A negative charge often resides on an O-atom. In general, a counter ion of opposite charge to the dye radical is produced by this reaction. If necessary or desired, this counter ion may be exchanged by a more proper, non-nucleophilic one with respect to the intended application e. g. by ion exchange resins, dialysis etc.

For example, in the case of formation of an electrophoretic particle carrying a covalently bound dye molecule of the formula (A) mentioned above, first a compound of the formula (AI) as defined above is copolymerized under emulsion polymerization conditions as described above to give a precursor polymer product with particles of the formula IA

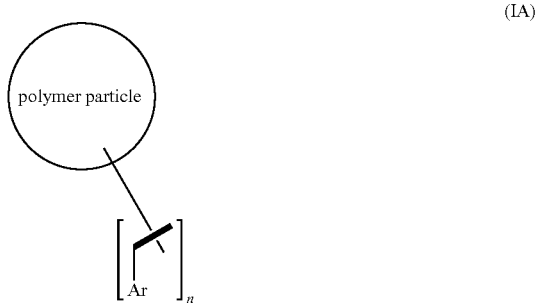

(IA)

where preferably the polymer particles are based on the polymerization product of styrene and styrene derivatives, however not restricted to those monomers, (and the compound of the formula AI), that is, a cross-linked polystyrene particle, especially based on styrene and (e.g. para-)divinyl benzene, preferably the emulsion polymerization being a microemulsion polymerization, Ar is as defined for a compound of the formula A, n is a natural number, and the bold line "▬▬" marks the ethylene or ethantriyl moiety via which the radicals represented in brackets are bound to the particle polystyrene scaffold, which may be bound directly to the aromatic ring of Ar or preferably to a N-mono- or N,N-di-($C_1$-$C_7$-alkyl-, $C_2$-$C_7$-alkenyl, phenyl-$C_1$-$C_7$-alkyl and/or phenyl-$C_2$-$C_7$-alkenyl)-amino substituent comprised in Ar; which is then in a second (dye- and charge-forming) step (preferably after at least partial isolation and/or purification) reacted with a Chargeless Educt of the formula (AII) given above to form electrophoretic particles of the formula (AAA)

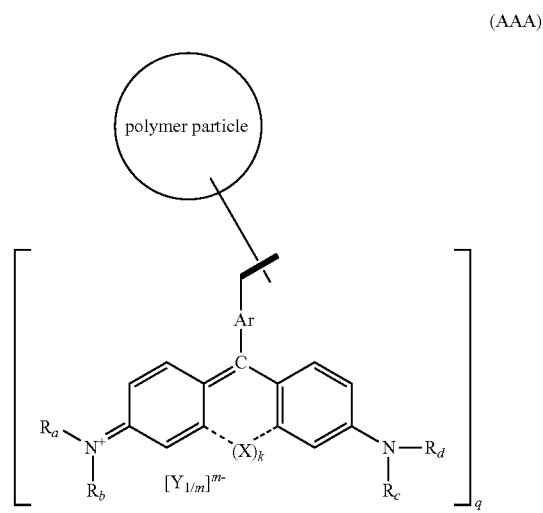

(AAA)

wherein the polymer particle is as defined under formula (IA) and Ar, $R_a$, $R_b$, $R_c$, $R_d$, X, Y, k, and m are as defined for a compound of the formula (A) above and q is an integer equal to or larger than 1, and the bold line marks an ethylene or ethantriyl moiety via which the Ar radical represented in brackets (directly from the aryl moiety or preferably via a carbon of an N-mono- or N,N-di-($C_1$-$C_{45}$ (preferably $C_1$-$C_7$)-alkyl-, $C_2$-$C_{45}$ (preferably $C_2$-$C_7$)-alkenyl, phenyl-$C_1$-$C_{45}$ (preferably $C_1$-$C_7$)-alkyl and/or phenyl-$C_2$-$C_{45}$ (preferably $C_1$-$C_7$)-alkenyl)-amino) is bound to the particle polymer scaffold, and where only one of the mesomeric forms all of which are meant to be included is shown. The second reaction step preferably takes place with the particles of the formula (IA) (dispersed) in an appropriate solvent, such as a hydrocarbon, e.g. benzene or toluene, with the benzophenone derivative of the formula (AII) as defined above in the presence of an inorganic acid halide, especially phosphoroxy chloride, preferably at elevated temperatures, e.g. in the range from 20 to 100° C.

Preferably, in the emulsion polymerization reaction as a starting material of the formula AI (Copolymerizable Precursor) a compound of the formula (AI*)

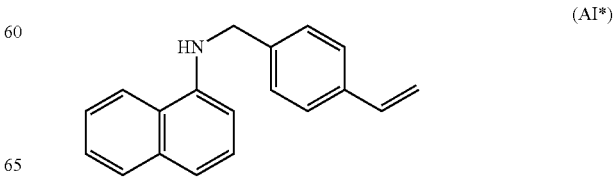

(AI*)

is copolymerized to give corresponding particles of the formula IA*,

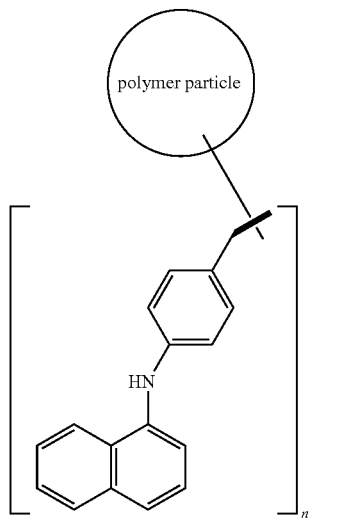

(IA*)

wherein the bold line has the meaning given for formula (AAA) which, in the second (dye- and charge-forming) step is then reacted with, as a Chargeless Educt, a compound of the formula (AII), especially 4,4'-bis(dimethylamino)-benzophenone (Michler's Ketone), preferably under reaction conditions as described for the charge and dye formation, to the corresponding particles of the formula (AAA*), (AAA*)

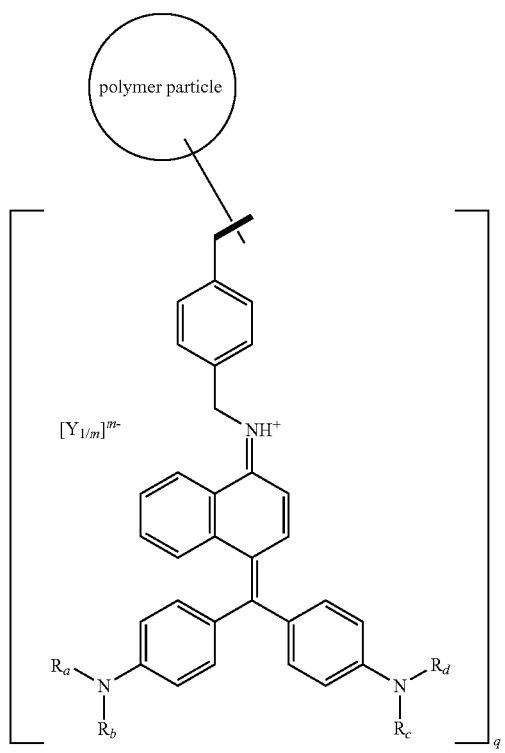

wherein $R_a$, $R_b$, $R_c$, $R_d$, Y, m, q and the bold line have the meanings indicated for particles of the formula (AAA), which particles as such also form an embodiment of the invention.

In the case of formation of an electrophoretic particle carrying a covalently bound dye molecule of the formula (B) mentioned above, first a compound of the formula (BI) as defined above is copolymerized under emulsion polymerization conditions as described above to give a precursor polymer product with particles of the formula IB

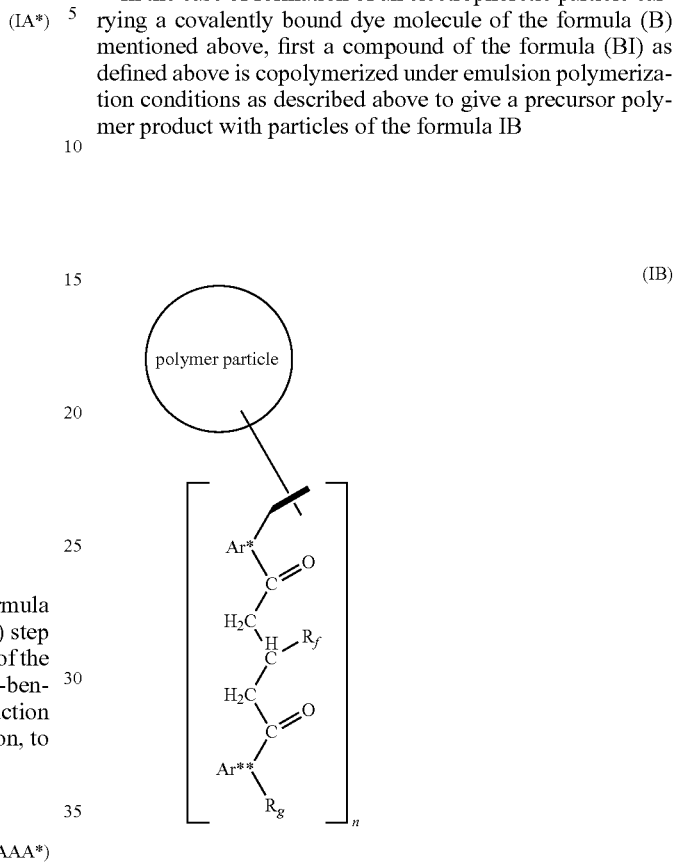

(IB)

where preferably the polymer particles are based on the polymerization product of styrene and styrene derivatives, however not restricted to these monomers, (and the compound of the formula BI), that is, a cross-linked polystyrene particle, especially based on styrene and (e.g. para-)divinyl benzene, preferably the emulsion polymerization being a microemulsion polymerization; Ar* is as defined for a compound of the formula B, n is a natural number, and the bold line "▬▬" marks the ethylene or ethantriyl moiety via which the radicals represented in brackets are bound to the particle polystyrene scaffold, which may be bound directly (preferred) to the aromatic ring of Ar* or to a N-mono- or N,N-di-($C_1$-$C_{45}$ (preferably $C_1$-$C_7$)-alkyl-, $C_2$-$C_{45}$ (preferably $C_2$-$C_7$)-alkenyl, phenyl-$C_1$-$C_{45}$ (preferably $C_1$-$C_7$)-alkyl and/or phenyl-$C_2$-$C_{45}$ (preferably $C_2$-$C_7$)-alkenyl)-amino substituent comprised in Ar; and $R_f$, $R_g$ and Ar** are as defined for a compound of the formula (B);

which is then in a second (dye- and charge-forming) step (in the same batch or after at least partial isolation and/or purification) reacted as a Chargeless Educt (being the Chargeless Educt itself!) in the presence of an acid, such as perchloric acid or boron trifluoro etherate and acetic acid, and an oxidizing agent, e.g. oxygen or an inorganic or organic peroxide, such as hydrogen peroxide, a peracid or an oxidizing (e.g. $Fe^{3-}$) salt, (under dehydration) to form electrophoretic particles of the formula (BBB),

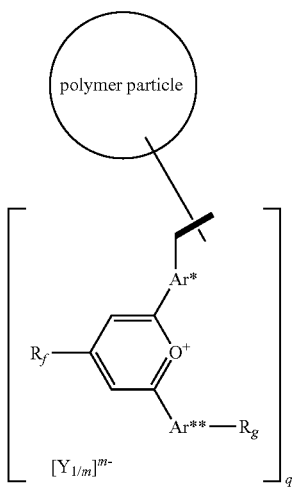

(BBB)

wherein the polymer particle is as defined under formula (IB) and Ar*, Ar**, $R_f$, $R_g$, Y, m and q are as defined for a compound of the formula (B) above, and the bold line marks an ethylene or ethantriyl moiety via which the Ar radical represented in brackets, preferably directly from the aryl moiety or via a carbon of an N-mono- or N,N-di-($C_1$-$C_{45}$ (preferably $C_1$-$C_7$)-alkyl-, $C_2$-$C_{45}$ (preferably $C_2$-$C_7$)-alkenyl, phenyl-$C_1$-$C_{45}$ (preferably $C_1$-$C_7$)-alkyl and/or phenyl-$C_2$-$C_{45}$ (preferably $C_2$-$C_7$)-alkenyl)-amino substituent, is bound to the particle polymer scaffold, and where only one of the mesomeric forms all of which are meant to be included is shown; and, if desired, If desired (e.g. in order to provide a bathochromic shift, deepening the color of the particles), if $R_f$ is hydrogen, in yet another step the hydrogen $R_f$ in electrophoretic particles of the formula (BBB) is then replaced by a different moiety $R_f$ which is phenyl or naphthyl that is unsubstituted or substituted by $C_1$-$C_{45}$alkyl wherein one or more hydrogen atoms can be replaced with fluorine and which is linear or branched wherein one or more $CH_2$ groups may be replaced with O, Si($C_1$-$C_{45}$ (preferably $C_1$-$C_7$)-alkyl)$_2$ and/or Si($C_1$-$C_{45}$ (preferably $C_1$-$C_7$)-alkyl)$_2$-O, or preferably by $NK_1K_2$ wherein $K_1$ and $K_2$ are independently from each other selected from $C_1$-$C_{45}$alkyl wherein one or more hydrogen atoms can be replaced with fluorine and which is linear or branched wherein one or more $CH_2$ groups other than those binding to N may be replaced with O, Si($C_1$-$C_{45}$ (preferably $C_1$-$C_7$)-alkyl)$_2$ and/or Si($C_1$-$C_{45}$ (preferably $C_1$-$C_7$)-alkyl)$_2$-O; or one of $K_1$ and $K_2$ is aryl or aryl-$C_1$-$C_{45}$ (preferably $C_1$-$C_7$)-alkyl, especially phenyl, naphthyl, phenyl-$C_1$-$C_{45}$ (preferably $C_1$-$C_7$)-alkyl or naphthyl-$C_1$-$C_{45}$ (preferably $C_1$-$C_7$)-alkyl, wherein aryl is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, Si($C_1$-$C_{45}$ (preferably $C_1$-$C_7$)-alkyl)$_2$ and/or Si($C_1$-$C_{45}$ (preferably $C_1$-$C_7$)-alkyl)$_2$-O by reaction of the particles of the formula (BBB) with a compound of the formula BII as defined above, especially under the reaction conditions mentioned above.

Preferably, in the emulsion polymerization reaction as a starting material of the formula BI (Copolymerizable Precursor) a compound of the formula (BI*)

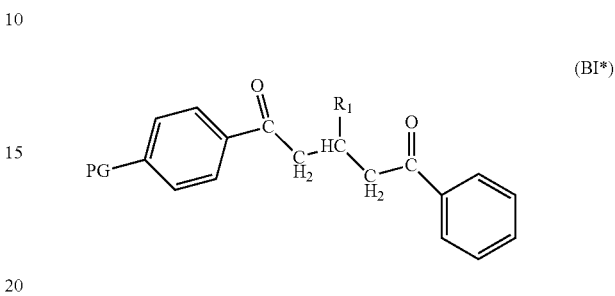

(BI*)

wherein PG and $R_f$ (which is preferably hydrogen) are as defined for a compound of the formula (BI) above, is copolymerized to give corresponding particles of the formula IB*,

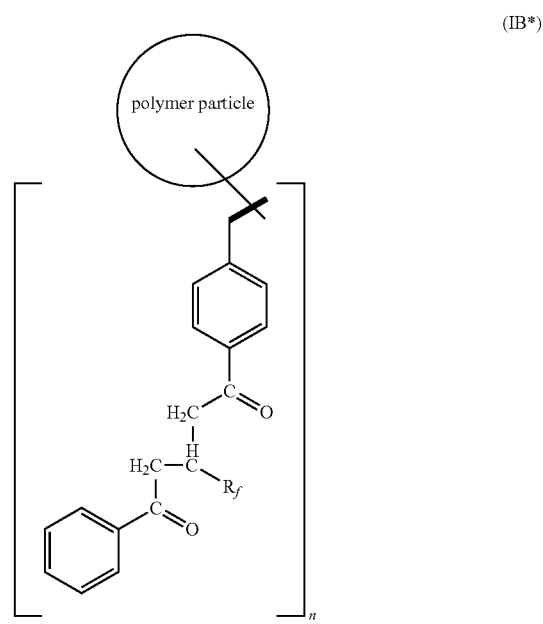

(IB*)

wherein n is an integer of 1 or larger, $R_f$ is as defined for a compound of the formula BI (and is preferably hydrogen) and the polymer particle and the bold line have the meaning given under formula (BBB) which, in the second (dye- and charge-forming) step is then reacted under cyclization in the presence of an acid and an oxidizing agent (preferably under the reaction conditions given above for the reaction of the particles of the formula (IB) to those of the formula (BBB)) to the corresponding particles of the formula (BBB*),

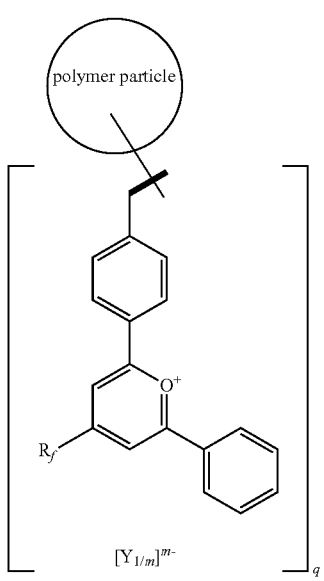

(BBB*)

wherein $R_f$ (which is preferably hydrogen), Y, m, q, the polymer particle and the bold line have the meanings indicated for particles of the formula (BBB), which particles as such also form an embodiment of the invention; and, if desired (e.g. in order to provide a bathochromic shift) reacting a compound of the formula (BBB*) wherein $R_f$ is hydrogen and the other symbols are as just defined, under coupling with a compound of the formula BII, $$HR_f*$$ (BII)

wherein $R_f*$ is phenyl or naphthyl that is unsubstituted or substituted by $NK_1K_2$ wherein $K_1$ and $K_2$ are independently from each other selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl$)_2$ and/or $Si(C_1$-$C_{45}$ (preferably $C_1$-$C_7$)-alkyl$)_2$-O; or one of $K_1$ and $K_2$ is aryl or aryl-$C_1$-$C_{45}$ (preferably $C_1$-$C_7$)-alkyl, especially phenyl, naphthyl, phenyl-$C_1$-$C_{45}$ (preferably $C_1$-$C_7$)-alkyl or naphthyl-$C_1$-$C_{45}$ (preferably $C_1$-$C_7$)-alkyl, wherein aryl is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$ (preferably $C_1$-$C_7$)-alkyl$)_2$ and/or $Si(C_1$-$C_{45}$ (preferably $C_1$-$C_7$)-alkyl$)_2$-O, thus obtaining a compound of the formula (BBB*) wherein $R_f$ has the meanings just given for $R_f*$.

Due to the electrophilic nature of the pyrylium cation, this reaction can take place spontaneously, e.g. in an appropriate aprotic solvent, such as an ether, a halogen-substituted hydrocarbon or a hydrocarbon, e.g. toluene, at temperatures in the range from e.g. 0° C. to the reflux temperature of the reaction mixture, preferably assisted by the addition of an organic (e.g. tertiary nitrogen, such as triethylamin, diisopropylethylamine or pyridine) or inorganic (e.g. a (hydrogen)carbonate of potassium, sodium or calcium) base.

The counterions $BF_4^-$ may also be exchanged subsequently against different anions; which particles as such also form an embodiment of the invention.

In the case of formation of an electrophoretic particle carrying a covalently bound dye molecule of the formula (C) mentioned above, first a compound of the formula (CI) as defined above is copolymerized under emulsion polymerization conditions as described above to give a precursor polymer product with particles of the formula (IC)

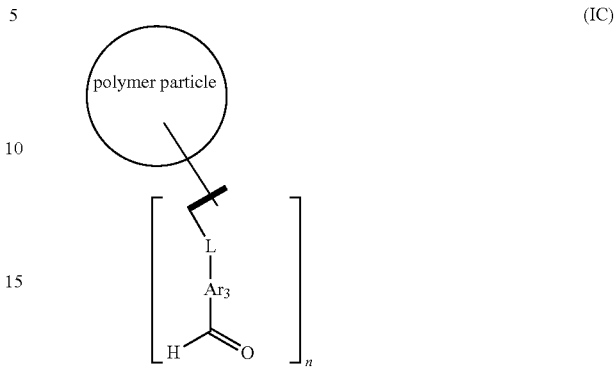

(IC)

where preferably the polymer particles are based on the polymerization product of styrene and styrene derivatives, however not restricted to the derivatives, (and the compound of the formula AI), that is, a cross-linked polystyrene particle, especially, based on styrene and (e.g. para-)divinyl benzene, preferably the emulsion polymerization being a microemulsion polymerization; or a derivative thereof wherein the aldehyde function (CHO) is protected, $Ar_3$ is as defined for a compound of the formula C, L is a linker or is absent (so that L and the two bonds emergin from it together are a bond), preferably a bond or more preferably C(=O)—O wherein the carbonyl (C(=O)) is bound to the bold line and the O to $Ar_3$; preferably n is a natural number, and the bold line "━━" marks the ethylene or ethantriyl moiety via which the radicals represented in brackets are bound to the particle polystyrene scaffold, which may be bound directly to the aromatic ring of $Ar_3$ or to a N-mono- or N,N-di-($C_1$-$C_7$-alkyl-, $C_2$-$C_7$-alkenyl, phenyl-$C_1$-$C_7$-alkyl and/or phenyl-$C_2$-$C_7$-alkenyl)-amino substituent comprised in Ar; which is then in a second (dye- and charge-forming) step (preferably after at least partial isolation and/or purification) reacted with a Chargeless Educt of the formula (CII) mentioned above and under the reaction conditions given above for the reaction of compounds of the formula CI with compounds of the formula CII to form electrophoretic particles of the formula (CCC)

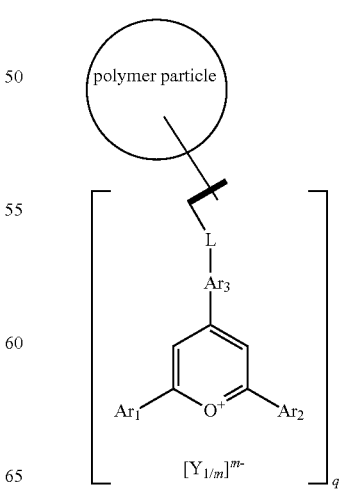

(CCC)

wherein the polymer particle is as defined under formula (IC) and $Ar_1$, $Ar_2$, $Ar_3$, Y, m and q are as defined for a compound of the formula (C) above, L is as defined for a compound of the formula (IC) and the bold line marks an ethylene or ethantriyl moiety via which the Ar radical represented in brackets (directly from the aryl moiety or preferably via a carbon of an N-mono- or N,N-di-($C_1$-$C_{45}$ (preferably $C_1$-$C_7$)-alkyl-, $C_2$-$C_{45}$ (preferably $C_2$-$C_7$)-alkenyl, phenyl-$C_1$-$C_{45}$ (preferably $C_1$-$C_7$)-alkyl and/or phenyl-$C_2$-$C_{45}$ (preferably $C_2$-$C_7$)-alkenyl)-amino) is bound to the particle polymer scaffold, and where only one of the mesomeric forms all of which are meant to be included is shown. The second reaction step preferably takes place with the particles of the formula (IC) (dispersed) in an appropriate solvent, such as a hydrocarbon, e.g. benzene or toluene, or preferably a halogenated hydrocarbons, such as 1,2-dichloroethane, in the presence of boron trifluoride-diethylether complex ($BF_3OEt_2$), e.g. at temperatures from −30 to 35° C.

Preferably, in the emulsion polymerization reaction as a starting material of the formula (CI) (Copolymerizable Precursor) a compound of the formula (CI*),

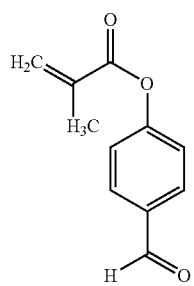

(CI*)

is copolymerized to give corresponding particles of the formula IC*,

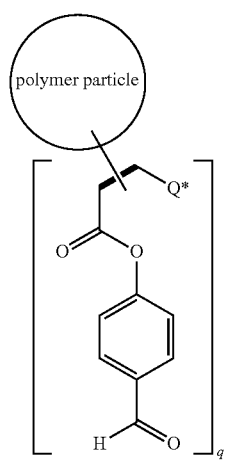

(IC*)

wherein the bold line has the meaning given under formula (CCC), q is an integer of 1 or larger, and Q* is hydrogen or methyl, which, in the second (dye- and charge-forming) step is then reacted with, as a Chargeless Educt compound of the formula (CII), acetophenone, preferably under reaction conditions as described for the charge and dye formation, to the corresponding particles of the formula (CCC*),

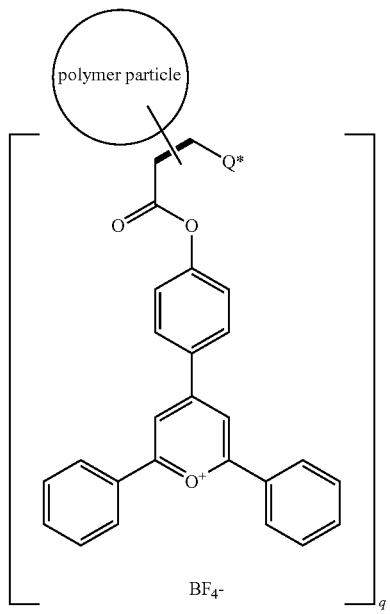

(CCC*)

wherein Q* is as defined for the compound of the formula (IC*); and the counterions $BF_4^-$ may also be exchanged subsequently against different anions; which particles as such also form an embodiment of the invention.

In yet an other example a yellow particle D* is obtained by polymerizing vinyl aniline under the conditions outlined for 1A* with styrene and para-divinyl benzene to form the precursor 1D*.

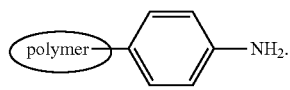

1D*

This material then may be reacted in the presence of a weak acid catalyst, often at 0° C. to 120° C., preferably at 10° C. to 40° C., with an aromatic amino aldehyde D1

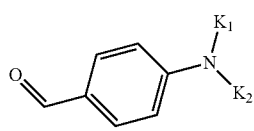

D1 wherein K1 and K2 are defined as above, to form the yellow particle DD*.

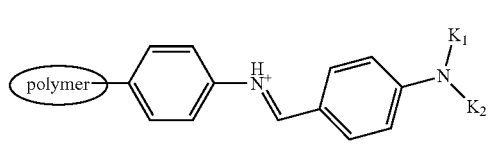

DD*

$Y_{(1/m)}^{m-}$

In another example a blue particle E* is obtained by copolymerising an amine 1E with K1 as defined above,

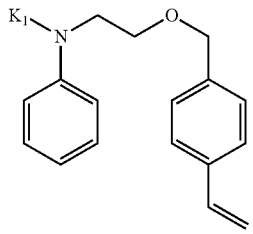

1E as outlined for example IA, to give the precursor 1EEE:

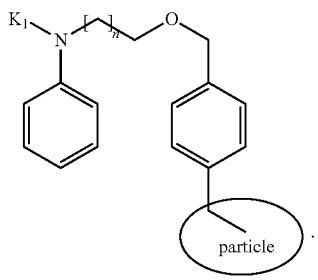

1EEE

This material is then reacted with a known diazonium salt E2

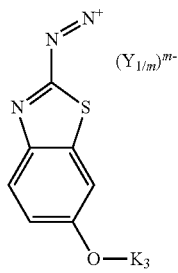

E2 with Y, K3 and m as defined above, e.g. in a solvent, preferably low boiling alcohols like ethanol isopropanol propanol etc, which dissolves the diazonium salt at least to a minimum amount for continuous addition to the particle 1EEE dispersed in the same solvent at −10° C. to 10° C. to form the particle E3 with K1 and K2 and n as define above.

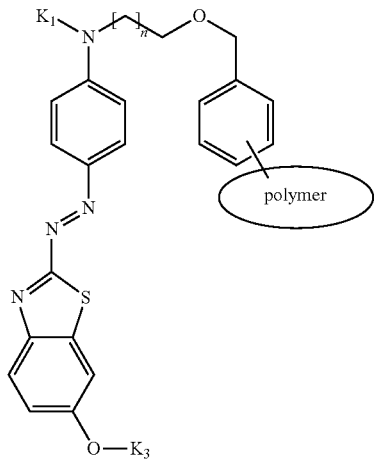

E3

This is then alkylated, for example at 60° C. to 150° C., preferably 60° C. to 120° C. in an alcoholic solvent like the one indicated above, with K2-hal or K2-mesylate or K2-tosylate (hal=chloride, bromide or iodide) to give the blue particle E* with K1, K2, K3 Y, m and n as indicated above.

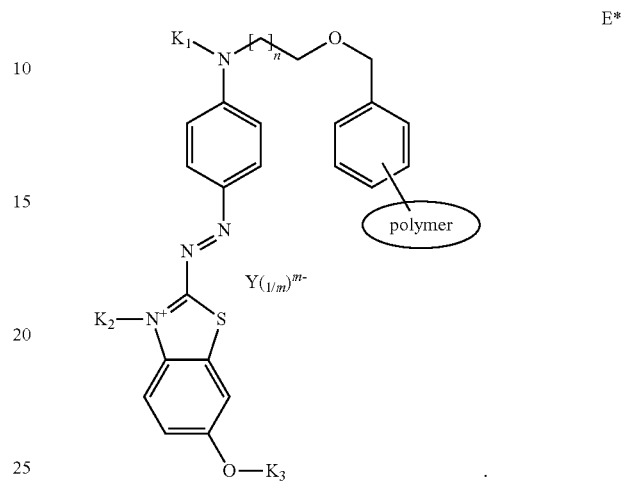

E*

The amine 1E may be obtained from commercial 11E, for example by benzylation with para-vinyl benzyl chloride in the presence of sodium hydride as a base at 0° C. to room temperature.

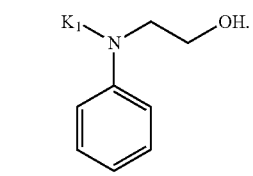

11E

The final nano-particular products may be harvested and purified by precipitation in appropriate solvents, filtration, centrifugation and lyophilization, which is known to persons skilled in the art. Counterions, especially anions $[Y_{1/m}]^{m-}$, may be exchanged against other counterions, e.g. by washing with appropriate salt solutions, addition of appropriate acids (to exchange the anions) or of appropriate bases (to exchange the cations) in order to tune the properties of the particles and of the dispersion comprising the charged particles.

Many of the mentioned dyes, as well as starting materials and reactions for charge and dye forming, can be found in Klaus Hunger (ed.), "Industrial Dyes—Chemistry, Properties, Applications", Wiley-VCH Verlag GmbH & Co KgaA, Weinheim 2003, which, especially concerning cationic and anionic dyes and their synthesis and starting materials, is incorporated by reference herein. Corresponding Copolymerizable Precursors with polymerizable functions can be synthesized in analogy to the methods described and/or referenced therein and to known procedures.

Anionic counterions $[Y_{1/m}]^{m-}$ may be selected, for example, from organic or inorganic anions, such as halide (preferably chloride, bromide, iodide), sulfate, hydrogen sulfate, phosphate, perchlorate, phosphorus hexafluoride ($PF_6^-$), hexahalo antimonate, boron tetrafluoride ($BF_4^-$), boron tetraphenyl ($Ph_4B^-$), carbonate, bicarbonate, oxalate or $C_1$-$C_8$alkyl sulfate, especially methyl, ethyl or aryl sulfate, methyl, ethyl or aryl sulfonate; anionic counterion can also include lactate, formiate, acetate, propionate or a complex anion, such as the zinc chloride double salt, $SbCl_6^-$, and/or long chain carboxylates. Preferred are bulky, non-nucleophilic counter ions such as $Cl^-$, $Br^-$, $I^-$, $R''COO^-$ ($R''$=H, branched or linear alkyl or unsubstituted or substituted phenyl), $BF_4^-$, $PF_6^-$, $SbCl_6^-$, $SbF_6^-$, $ClO_4^-$, $BrO_4^-$, $IO_4^-$, $B(OR)_4^-$, $BR_4^-$, $R-SO_3^-$, $RR'P(O)O^-$, $ROR'OP(O)O^-$, etc., where R and R' independently are branched or linear alkyl, or unsubstituted or substituted phenyl.

Cationic counterions denote, for example, ions like those of the formulae $N(R_x^*)_4^+$ (e.g. ARQUAD 18-50 (Akzo Nobel Surfactants, Chicago, Ill., USA), $P(R_y^*)_4^+$ or alkali metal ions, wherein the four radicals $R_x^*$ as well as the four radicals $R_y^*$ can have the same or different meanings, and are hydrogen; aryl, e.g. phenyl, $C_1$-$C_{12}$alkyl which can be interrupted by —O— and can be substituted by hydroxyl or phenyl, and wherein the phenyl radical can be further substituted by $C_1$-$C_8$alkyl, $C_1$-$C_8$alkoxy or halogen; or phenyl which can be substituted by $C_1$-$C_8$alkyl, $C_1$-$C_8$alkoxy or halogen. It is preferred that $R_x^*$ or $R_y^*$ is hydrogen or $C_1$-$C_{12}$alkyl, especially $C_1$-$C_{12}$alkyl. Examples of alkali metal ions are lithium, sodium, potassium and cesium.

In general, counterions are preferably selected from bulky ones, such as ions containing 10 or more atoms, and/or those wherein the charge is delocalized to some extent; examples are borides or borates containing alkyl or phenyl moieties, or phosphoric hydrocarbyl diester monoanions.

Wherever alkyl or other chains are mentioned that are interrupted by O, O is not bound to another O (that is, most preferably O is always bound to two C atoms).

A starting material of the formula AI, especially AI*, can be prepared in analogy to or by the method given in Example I, or they are commercially available or can be obtained according to methods that are known in the art.

Starting materials of the formula BI, CI and CII can be prepared in analogy to the methods given in the examples, to methods known in the art of are commercially available.

For example, a compound of the formula BI can be synthesized starting from a compound of the formula (Ba)

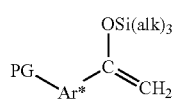

wherein PG and Ar* are as defined for a compound of the formula BI and alk is alkyl, especially $C_1$-$C_7$-alkyl, can be reacted with an α,β-unsaturated ketone of the formula (Bb),

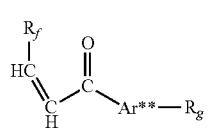

wherein Ar**, $R_f$ and $R_g$ are as defined for a compound of the formula (BI), e.g. at temperatures in the range from –80° C. to 40° C., if desirable in the presence of a catalyst, e.g. fluoride, titan catalysts or the like, followed by hydrolysis of the O—Si(alk)$_3$ group, e.g. during working up, to give the corresponding compound of the formula BI.

A compound of the formula (Ba) can be formed, e.g., from a corresponding ketone of the formula (Bc),

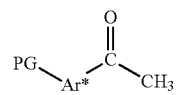

wherein PG and Ar* are as defined for a compound of the formula (BI) by removing the enol form by capturing its (then protected) enol form with a Trialkylsilylhalogenide, e.g. trimethylsilylhalogenide.

A compound of the formula (Bc) can, for example, be obtained from a bromo compound of the formula (Bd)

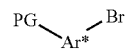

by acylation of the compound in organometal (especially with Mg—Br instead of the Br) form under Grignard conditions with an carbonic acid anhydride, e.g. acetic acid anhydride.

A compound of the formula (Bb) is known in the art, can be prepared according to or in analogy with methods known in the art and/or is commercially available.

Aldehydes of the formula (CI) are known or can be prepared according to methods that are known in the art; for example, a compound of the formula (CI) wherein PG is (meth)acryloxy can be prepared from a phenol of the formula (Ca)

wherein $Ar_3$ is as defined for a compound of the formula (C) by reaction with a corresponding (meth)acryl-halogenide (e.g. a chloride) under customary conditions, for example in the presence of a tertiary nitrogen base, such as triethylamine, an appropriate solvent, e.g. a halogenated hydrocarbon, such as methylene chloride, and e.g. at temperatures in the range from –30 to 50° C.

Preferred starting materials (especially Polymerizable Compounds and Chargeless Educts are those bearing substituents and precursors for each of them) are those leading to Polymerizable Compounds and Chargeless Educts mentioned as preferred.

In some methods of preparation for electrophoretic particles according to the invention and for starting materials as well as in other processes mentioned above and below, functional groups that are not to participate in the respective reaction and which would disturb the desired reaction or lead to side reactions are protected, where required. The introduction and the removal of protection, each at an appropriate stage, follows standard procedures known in the art, e.g. as mentioned in T. W. Greene and P. G. Wuts, "Protective Groups in Organic Synthesis", 3$^{rd}$ edition, John Wiley & Sons, Inc., New York 1999, from which also appropriate protecting groups e.g. for amino, hydroxyl, carboxy or other groups can be deduced conveniently. For example, imino can be protected by trifluoroacetyl, which can be removed, for example, with a basic metal hydroxide, especially an alkali-metal hydroxide, in a solvent, e.g. an aqueous alcohol, such as methanol or ethanol, preferably at elevated temperatures, e.g. from 30 to 100° C.

The invention also relates to displays comprising electrophoretic devices comprising one or more colored charged ("electrophoretic") particles, or a combination of two differently colored and then particles of opposite charge, according to the invention and the use of said particles for the manufacture of electrophoretic devices and electronic displays.

More preferably, for electrophoretic displays a combination of the dyed and thus colored particles is used (especially with particles of differing color in separate pixel elements, or in the same pixel.) and the dyed particles used are green, blue and red, or the dyes for particles used are magenta, yellow and cyan components of displays based on electrophoretic particles. These may be complemented by black particles, e.g. within separate electrophoretic devices, carrying black colorants to allow dark/light contrast modification, and/or white particles, e.g. as mentioned in the patent disclosures in the following paragraph.

Electrophoretic display systems including electrophoretic devices, as well as manufacturing methods for them and the use of electrophoretic particles in their manufacture, are in principle known (see for example U.S. Pat. No. 5,914,806, US-A-2004/0094422, WO-A-02/079869, incorporated by reference herein). The electrophoretic display systems usually comprise a plurality of such electrophoretic devices (e.g. as pixels), which may be mono- or multilayered).

The electrophoretic display system including the electrophoretic devices each include a pair of substrates and an electrophoretic dispersion placed in between the substrates and usually side walls, wherein at least one of the substrates comprises a transparent material, the substrates have a predetermined distance there between, and the electrophoretic dispersion contains at least a liquid dispersion medium (preferably based on a hydrophobic solvent, especially on $C_5$-$C_{45}$-alkanes, e.g. a $C_{10}$- to $C_{20}$-alkane, Isopar™ G, Isopar™ M, fluoro- or other halocarbons, silicon fluids, and the like.) and electrophoretic particles having a surface charge. When a voltage is applied between the substrates or side walls between chambers filled with dispersion, the particles electrophoretically migrate depending on the surface charge and the direction of the electric field, thereby changing the distribution of the electrophoretic particles. Therefore, the colour of the electrophoretic device is changed when viewed from a transparent substrate side. For example, when the charged particles move to one of the substrates, which serves as a display surface (one directed to a (potential) observer), the color possessed by the charged particles is recognized. Where the electrodes are lateral so that colored particles move to the side when a charge is applied the colored particles are removed from the field of view and thus the view to a different background color of a pixel or no color is opened. Thus, a desired image can be displayed by controlling the voltage being applied.

It is preferred that, in one embodiment of display devices with electrophoretic particles according to the invention, some display devices include red particles, some display devices include green particles and some display devices include blue particles. According to another embodiment it is preferred that some display devices include cyan particles, some display devices include magenta particles and some display devices include yellow particles. By addressing the display devices individually, a display can be caused to give an appearance corresponding to a selected colour at a selected brightness level. Further devices with white and/or black particles may be present in order to allow to change the contrast and/or the brightness of the display and the images displayed.

Interesting applications of the above described types of electrophoretic displays are the so-called microcell electrophoretic displays. In microcell electrophoretic displays, the particle containing dispersion medium is retained in a plurality of cavities formed within a carrier medium (see for example WO-A-02/01281 which is incorporated by reference herein, especially in this regard).

Another preferred electrophoretic display is electronic paper. This is typically a sheet-like display comprising a sheet-like display function layer.

Halo is preferably chloro, bromo, iodo or further fluoro.

Alkyl is preferably $C_1$-$C_{45}$-alkyl, more preferably $C_1$-$C_{18}$-alkyl, e.g. methyl, ethyl, n-propyl, isopropyl, n-butyl, sec.-butyl, isobutyl, tert-butyl or the like.

Aryl (also in an aromatic moiety or an aromate, also in arylene or the like) preferably has 6 to 20, more preferably 6 to 14 carbon atoms, and is mono-, bi-, tri- or higher polycyclic; aryl is, e.g., phenyl, naphthyl, anthracenyl, fluorenyl, indanyl, acenaphtenyl, aceanthrenyl, phenalenyl, phenanthrenyl, acenapthylenyl, triphenylenyl, pyrenyl, chrysenyl, naphthacenyl, perylenyl, or the like.

Heterocyclyl (also in a heterocyclic moiety or a heterocycle, also in heterocyclylene or the like) is preferably a mono-, di-, tri- or polycyclic moiety with preferably from 3 to 30 ring atoms, especially 4 to 20, yet more preferably 4 to 10 ring atoms, wherein at least one, preferably up to four, ring atoms are independently selected from the group consisting of N, NH, O or S and which is unsaturated, partially saturated or fully saturated; examples of heterocyclyl are thiophenyl, thianthrenyl, furanyl, 4H-pyranyl, isobenzofuranyl, 2H-chromenyl, xanthenyl, phenoxathiinyl, pyrrolyl, 2H-pyrrolyl, imidazolyl, pyrazolyl, isothiazolyl, isoxazolyl, pyridinyl, pyrazinyl, pyrimidinyl, pyridazinyl, pyrrolizinyl, morpholinyl, thiomorpholinyl, indolizinyl, isoindolyl, 3H-indolyl, indolyl, indazolyl, purinyl, 4H-chinolizinyl, isoquinolinyl, quinolinyl, phthalazinyl, 1,8-naphthyridinyl, chinoxalinyl, chinazolinyl, cinnolinyl, pteridinyl, 4aH-carbazolyl, phenantrhidinyl, acridinyl, perimidinyl, phenanthrolinyl, phenazinyl, phenothiazinyl, phenoxazinyl, isochromanyl, chromanyl, pyrrolidinyl, imidazolidinyl, piperidinyl, piperazinyl, indolinyl, isoindolinyl, chinuclidinyl, Where specific definitions are given, these are preferred.

Unless otherwise indicated, the general terms and names used in the disclosure of the present invention preferably have meanings given above or below used to define them more specifically (where more specific definitions, in each case separately, or in combination, may be used to replace more general terms in order to define more preferred embodiments of the invention, also in the claims).

"Obtainable" preferably means "obtained". Where more than one mesomeric (or tautomeric) form are possible, only one of them is represented which includes all other possible mesomeric (or tautomeric) formulae.

The invention relates especially to the embodiments represented in the claims, more preferably the dependent claims, and the claims are therefore incorporated by reference herein. Very especially, the invention relates to the embodiments given in the Examples.

The following Examples illustrate the invention in more detail but do not limit the scope thereof. Parts or percentages are by weight.

Example 1

Manufacture of Charged Blue Particles According to an Inventive Two-Step Procedure and the Resulting Particles Step 1: Synthesis of Neutral Copolymer Particle of Styrene, Para-Divinylbenzene and Compound 103 (Polymer 104) with a Precursor Component for a Blue Chromophore (polymer 104)

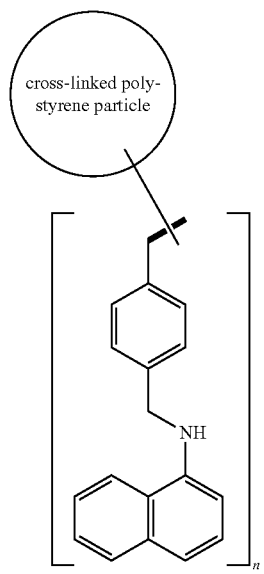

(n is a natural number, and the bold line "▬▬" marks an ethylene or ethantriyl moiety via which the dye radicals represented in brackets are bound to the particle polystyrene scaffold)

The nano-particle of the composition of formula (104) is obtained by the following procedure: A mixture of 2.1 g freshly distilled styrene, 0.6 g freshly distilled para-divinyl benzene and 0.3 g of compound (103) (see below) are emulsified in degassed distilled water (36 ml) containing 10.0 mg sodium hydrogen carbonate and 140 mg sodium dodecyl sulphate (Fluka) under a nitrogen atmosphere for 15 minutes at 70° C. under stirring at 500 Upm. After that time, the polymerisation is initiated by the addition of 16 mg potassium peroxo disulphate (Fluka) dissolved in 1.5 ml of distilled water via a syringe. The mixture is stirred at 70° C. for 22 h forming a bluish emulsion. After cooling to room temperature, the mixture is filtered through a paper filter (qual. 54 or 75 from Ederol, Germany). The filtrate is subsequently precipitated in 250 ml methanol and centrifuged at 4000 Upm for 15 to 20 minutes. The precipitate is then resuspended in methanol and centrifuged again (3 times) until no starting monomers (e.g. compound 103) can be detected by thin layer chromatography in the supernatant. The polymer latices are preferably stored in benzene. For the ensuing analytics a sample of the resulting precipitate is lyophilized from dioxane to give white particles of the composition of the formula (104).

Transmission electron microscopy from that highly homodisperse latex shows a particle size of 20 nm. An elemental analysis gives 0.44% (w/w) of nitrogen which equals 310 μmol incorporated compound (103) per gram of polymer.

Step 2: Synthesis of Charged Blue Particle (Polymer 105-2O)

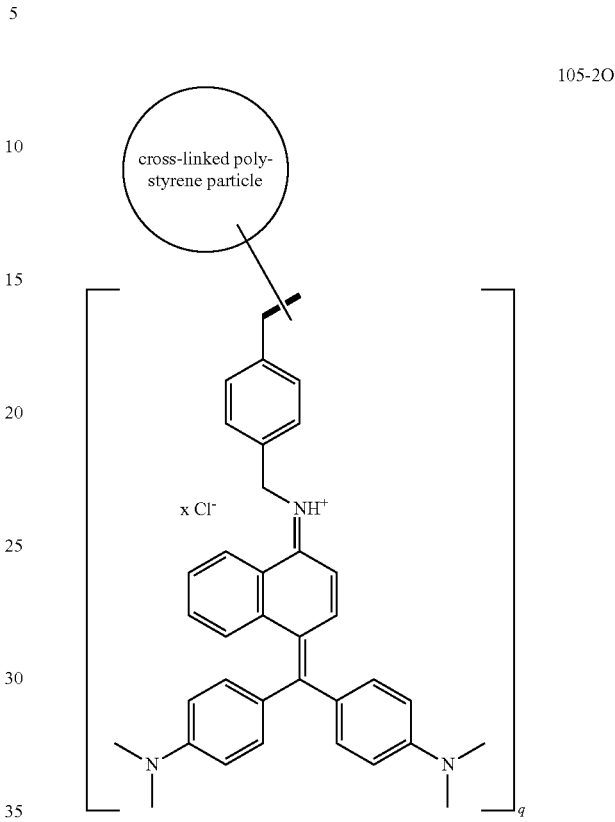

105-2O wherein q is a natural number (which may, due to the fact that some of the precursor moieties formed in polymer 104 may not react, be lower than or equal to n in polymer 104, and the bold line "▬▬" marks an ethylene or ethantriyl moiety via which the dye radicals represented in brackets are bound to the particle polystyrene scaffold); note that the above formula shows only one of the mesomeric forms of the resulting dye.

0.20 g of the neutral polymer compound 104 are suspended in 4 ml of dry benzene containing 0.20 g of 4,4'-bis(dimethylamino)-benzophenone (Fluka) 2O and 105 μl of phosphoroxy chloride (Fluka). The mixture is heated to 85° C. for 17 h. After cooling down to room temperature, the mixture is precipitated in ethanol and centrifuged (5 times) until no benzophenone can be detected by thin layer chromatography in the supernatants. The ethanol is subsequently replaced by several centrifugations with diethyl ether and finally the diethyl ether replaced by dodecane by the same procedure; the particles are preferably stored in an apolar organic solvent for a prolonged time.

For analytics the deep blue precipitate is then stirred into water and centrifuged from water (3 times) and finally lyophilized from dioxane to give a dark blue powder. Elemental analysis gives 1.74% of nitrogen per gram of this polymer latex.

TEM: Sizes of the particles around about 30 nm (e.g. 31 to 34 nm) are demonstrated.

The starting materials are prepared as follows:
a) Synthesis of a Compound of Formula (101)

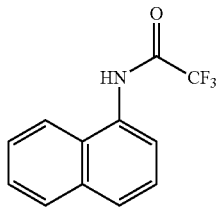
(101)

The compound of formula (101) is obtained from commercial (FLUKA) 1-amino-naphthalene. 50.0 g of 1-amino-naphthalene are dissolved at 0° C. in 300 ml dichloromethane and treated with 48.5 ml triethylamine (Fluka) and 48.5 ml of trifluoro acetic acid anhydride (Fluka). The mixture is stirred for 24 h while warming up to room temperature. The reaction mixture is then diluted with additional dichloromethane and successively extracted with 1 N hydrogen chloride, then saturated sodium hydrogen carbonate solution and finally brine. The organic phase is subsequently dried over magnesium sulphate, filtered and evaporated. Residual solvent is removed in high vacuum at room temperature. The compound of the formula (101) is obtained as slightly pink solid: $^1$H-NMR (CDCl$_3$, 300 MHz): δ 7.39 (t, 1H); 7.50 (m, 2H); 7.69 (m, 3H); 7.85 (m, 1H); 8.39 (broad s, 1H). $^{13}$C-NMR (CDCl$_3$, 75 MHz): δ 116.30 (q); 120.41; 122.13; 125.53; 126.69; 127.20; 127.31; 128.02; 129.00; 129.41; 134.21; 156.07 (q). $^{19}$F-NMR (CDCl$_3$, 282 MHz): δ—85.

b) Synthesis of a Compound of Formula (102)

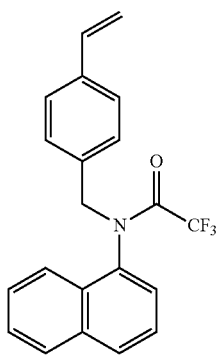
(102)

15.0 g of the compound of formula (101) are dissolved in 270 ml of dry dimethyl formamide and treated with 15.0 g para-vinyl-benzyl chloride (Fluka) and 13.5 g of dry potassium carbonate (Fluka) at 60° C. for 17 hours. After cooling down to room temperature, the mixture is diluted with ethyl acetate and successively extracted with water, 1 N hydrogen chloride and brine and dried over sodium sulphate. Filtration and evaporation of the solvent leaves a syrupy oil which is passed over a short silica gel pad (Fluka: mesh 230-400) and eluent (hexane-ethyl acetate 2:1 (v/v)) to give the compound of formula (102): $^1$H-NMR (CDCl$_3$, 300 MHz): δ 4.24 (d, 1H); 5.28 (dd, 1H); 5.73 (dd, 1H); 5.79 (s, 1H); 6.71 (dd, 1H); 6.95 (d, 1H); 7.12 (d 2H); 7.32 (m, 3H); 7.59 (m, 2H); 7.82 (m, 1H); 7.91 (m, 2H). $^{13}$C-NMR (CDCl$_3$, 75 MHz): δ 54.57; 114.60; 122.28; 125.01; 126.58 (2C); 126.95; 127.86; 127.98; 128.60 (q); 128.93; 130.06 (2C); 130.11 (2C); 134.49; 134.69; 135.19; 136.49; 137.75; 159.00 (q).

c) Synthesis of the Compound of Formula (103)

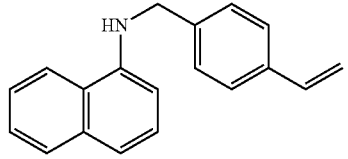
(103)

32.0 g of the compound of formula (102) are dissolved in 260 ml of a mixture (3 to 1 v/v) of ethanol and water and treated with 7.6 g of sodium hydroxide (Fluka) at 85° C. for one hour. After cooling down to room temperature the mixture is diluted with $^t$butyl methyl ether and successively extracted with water and brine and dried over sodium sulphate. Filtration and evaporation of the solvent leaves a syrupy mass which is passed over a short silica gel pad (Fluka: mesh 230-400) and eluent (hexane-ethyl acetate 4:1 (v/v)) to give the compound of formula (103): $^1$H-NMR (CDCl$_3$, 300 MHz): δ 4.55 (s, 2H); 4.80 (broad s, 1H); 5.43 (dd, 1H); 5.94 (dd, 1H); 6.74 (dd, 1H); 6.88 (dd, 1H); 7.40-7.62 (m, 8H); 7.88 (d, 1H); 7.95 (dd, 1H). $^{13}$C-NMR (CDCl$_3$, 75 MHz): δ 48.76; 105.26; 114.17; 118.07; 120.33; 123.82; 125.12; 126.13; 126.93 (2C); 127.02; 128.19 (2C); 129.09; 134.71; 136.89; 137.13; 139.16; 143.53.

Example 1.2

Further Charged-Dye Carrying Particles

In analogy to the preceding example, the following particles 105-2A-105-2F are prepared from the corresponding ketones 2A-2F:

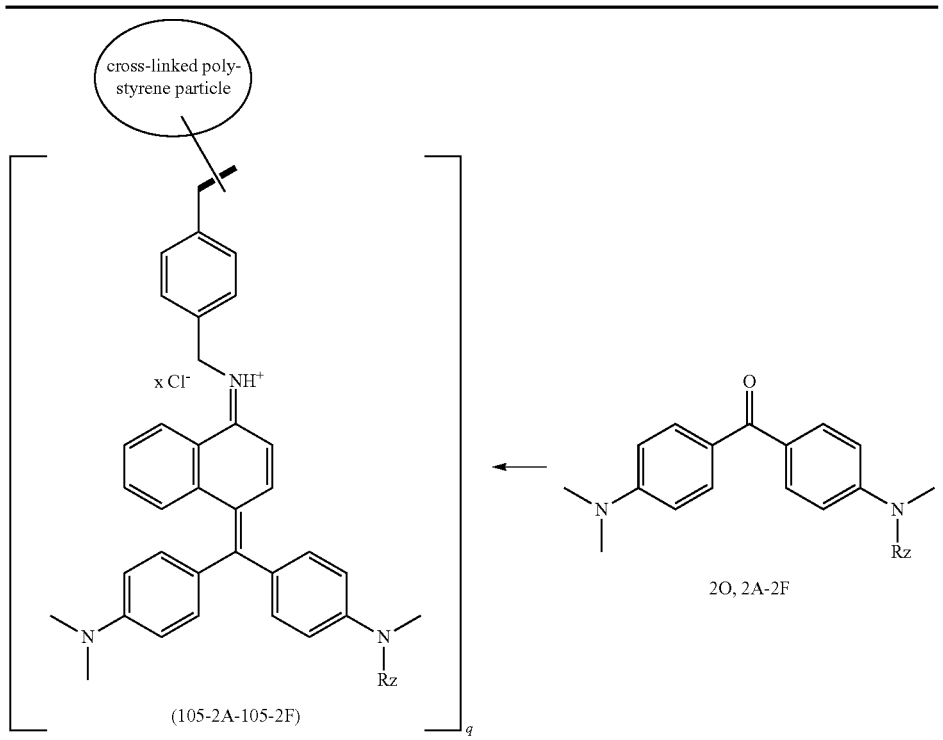

| Example | Rz |
|---|---|
| 105-2O | methyl |
| 105-2A | n-octyl |
| 105-2B | n-dodecyl |
| 105-2C | n-octadecyl |
| 105-2D | —$CH_2CH_2$—($OCH_2CH_2$)$_3$O($CH_2$)$_{11}CH_3$ |
| 105-2E | —$CH_2CH_2$—($OCH_2CH_2$)$_2$O($CH_2$)$_{17}CH_3$ |
| 105-2F | —$CH_2CH_2OCH_2CH_2CH_2$—Si($CH_3$)$_2$—(O—Si($CH_3$)$_2$)$_{ca.\ 11}$—OSi($CH_3$)$_2$—$CH_2CH_2CH_2CH_3$ |

General preparation of the corresponding ketone precursors of the above listed derivatives exemplified for compound 2B:

a) Preparation of Common Precursor:

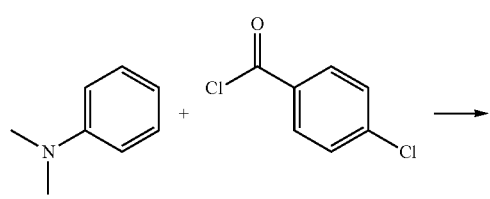

44.0 g of aluminum trichloride are dissolved at 0° C. in 200 ml dichloroethane. To this mixture are added 57.7 g of 4-chlorobenzoic acid chloride, dissolved in 50 ml dichloroethane over 30 minutes to form a red brown clear solution. This mixture is then treated with 44.0 g of N,N-dimethylamine, dissolved in 40 ml dichloromethane. The resulting mixture is stirred for 18 h whereby the reaction mixture warms up to room temperature. It is then poured on ice and basified (pH=12) with 4 N sodium hydroxide. The organic phase is separated and washed with water and brine and dried over sodium sulfate. Removal of the solvent gives a residue which is either purified by column chromatography over silica gel (eluent: dichloromethane-hexane:10-2) or crystallized from ethylacetate-diethylether to give 33.4 g of the chloroketone. $^1$H-NMR (CDCl$_3$, 300 MHz): δ 3.07 (s, 6H); 6.67 (dd, 2H); 7.41 (dd, 2H); 7.66 (dd, 2H); 7.75 (dd, 2H). $^{13}$C-NMR (CDCl$_3$, 75 MHz): δ 40.38; 110.85; 124.61; 128.48; 131.06; 132.80; 137.49; 137.82; 153.56; 193.78.

b) This ketone is converted to the desired diamine ketones (2A-2F) as exemplified for 2B:

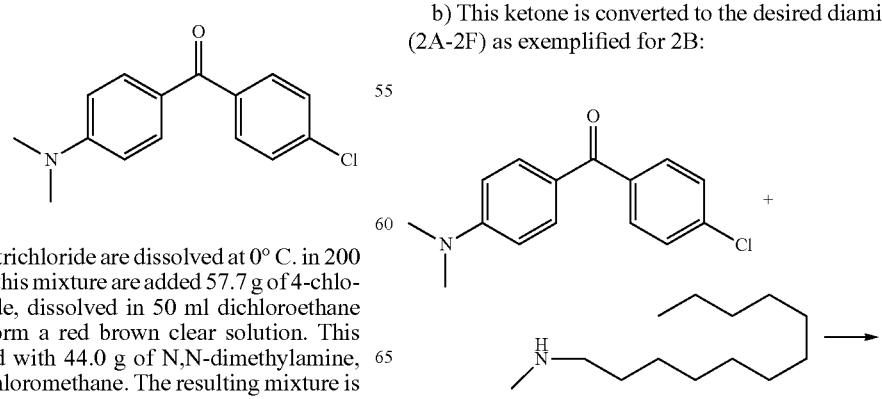

-continued

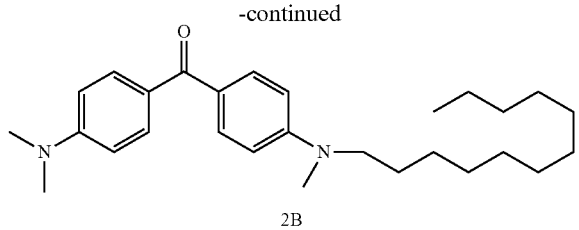

2B

According a given protocol (J. Wolfe et al. J. Org. Chem. 2000, 65, 1158) a Schlenk tube is charged in an argon atmosphere with 0.05 g palladium acetate, 2.33 g of the above chloride, 1.35 g sodium t. butoxide and 0.12 g of 2-(di-t.butylphosphino)biphenyl (from Strem chemicals). With rigorous exclusion of oxygen this mixture is dissolved in 30 of dry toluene and 2.14 g of N-methyl-dodecylamine and subsequently heated to 100° C. until the starting material is consumed. After cooling down the mixture is diluted with dichloromethane and successively extracted with 1 N hydrogen chloride and brine. The organic phase is dried over sodium sulfate and evaporated to leave an oily residue which is purified over a silica gel column (eluent: dichloromethane) to give 2.45 g of the diamino ketone 2B. $^1$H-NMR (CDCl$_3$, 300 MHz): δ 0.90 (t, 3H); 1.26-1.37 (m, 18H); 1.56-1.66 (broad m, 2H); 3.03 (s, 3H); 3.06 (s, 6H); 3.39 (t, 2H); 6.67 (dd, 4H); 7.75 (dd, 4H).

Compounds 2A, 2C-2G are obtained in an analogous fashion in comparable yields.

Data for

2A: $^1$H-NMR (CDCl$_3$, 300 MHz): δ 0.88 (t, 3H); 1.23-1.35 (m, 10H); 1.56-1.66 (broad m, 2H); 3.03 (s, 3H); 3.06 (s, 6H); 3.38 (t, 2H); 6.75 (dd, 4H); 7.74 (dd, 4H).

2C: $^1$H-NMR (CDCl$_3$, 300 MHz): δ 0.89 (t, 3H); 1.26-1.37 (m, 30H); 1.56-1.66 (broad m, 2H); 3.03 (s, 3H); 3.06 (s, 6H); 3.39 (t, 2H); 6.68 (dd, 4H); 7.74 (dd, 4H).

2D: $^1$H-NMR (CDCl$_3$, 300 MHz): δ 0.88 (t, 3H); 1.25-1.38 (m, 18H); 1.52-1.59 (broad m, 2H); 3.05 (s, 3H); 3.07 (s, 6H); 3.44 (t, 2H); 3.54-3.70 (m, 16H); 6.70 (dd, 4H); 7.73 (dd, 4H).

2E: $^1$H-NMR (CDCl$_3$, 300 MHz): δ 0.80 (t, 3H); 1.16-1.22 (m, 30H); 1.46-1.51 (broad t, 2H); 2.97 (s, 6H); 2.99 (s, 3H); 3.36 (t, 2H); 3.46-3.62 (m, 12H); 6.61 (dd, 4H); 7.75 (dd, 4H).

2F: $^1$H-NMR (CDCl$_3$, 300 MHz): δ 0.04 (s, 66H); 0.51 (m, 4H); 0.84 (t, 3H); 1.21-1.32 (m, 4H); 1.49-1.60 (broad m, 2H); 3.00 (s, 6H); 3.04 (s, 3H); 3.35 (t, 2H); 3.56 (m, 4H); 6.65 (dd, 4H); 7.71 (dd, 4H).

Example 1.3

Further Charged-Dye Carrying Particles

In analogy to the preceding examples, the following particles are prepared with two elongated chains on either nitrogen of the ketone precursor:

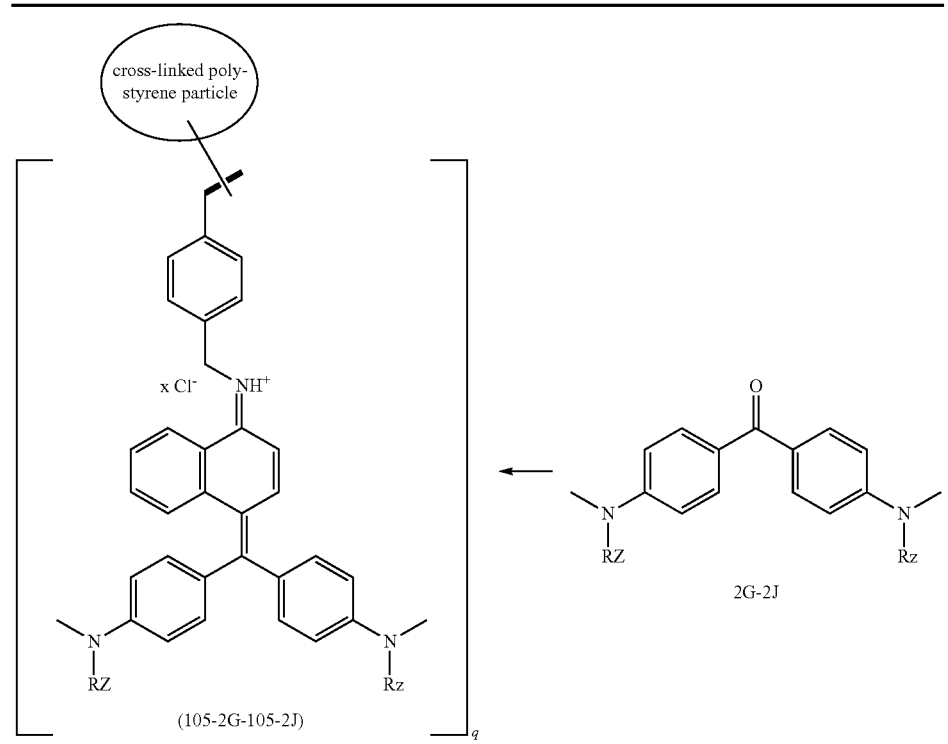

| Example | Rz |
|---|---|
| 2G | n-octadecyl |
| 2H | —CH$_2$CH$_2$—(OCH$_2$CH$_2$)$_3$O(CH$_2$)$_{11}$CH$_3$ |
| 2IE | —CH$_2$CH$_2$—(OCH$_2$CH$_2$)$_2$O(CH$_2$)$_{17}$CH$_3$ |
| 2J | —CH$_2$CH$_2$OCH$_2$CH$_2$CH$_2$—Si(CH$_3$)$_2$—(O—Si(CH$_3$)$_2$)$_{ca.\ 11}$—OSi(CH$_3$)$_2$—CH$_2$CH$_2$CH$_2$CH$_3$ |

The corresponding ketones are obtained as is exemplified for compound 2G:

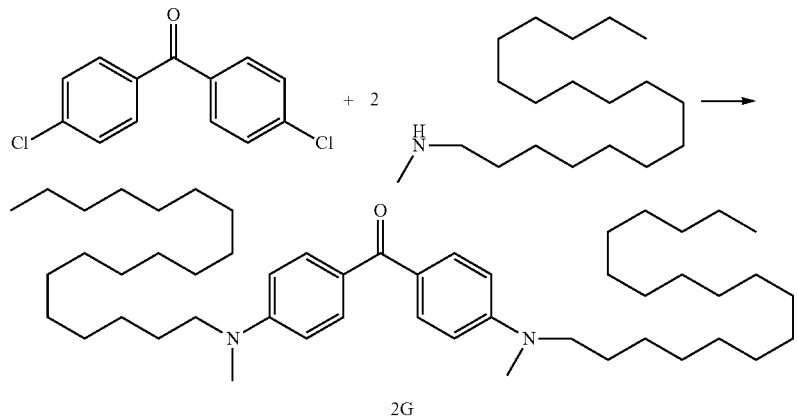

2G

According the procedure given for the preparation of 2B, 7.8 g of N-methyl-octylamine, 3.0 g of para-dichloro benzophenone, 3.6 g sodium t. butoxide, 0.12 g palladium acetate and 0.32 g of 2-(di-t.butylphosphino)biphenyl (from Strem chemicals) are heated in 50 ml toluene to 100° C. to give after the usual work-up procedure 6.1 g of the keto amine 2G.
$^1$H-NMR (CDCl$_3$, 300 MHz): δ 0.90 (t, 6H); 1.25-1.37 (m, 60H); 1.58-1.65 (broad m, 4H); 3.02 (s, 6H); 3.38 (t, 4H); 6.67 (dd, 4H); 7.73 (dd, 4H).

Data for

2'G: $^1$H-NMR (CDCl$_3$, 300 MHz): δ 0.89 (t, 6H); 1.24-1.30 (m, 36H); 1.50-1.63 (broad m, 4H); 2.98 (s, 6H); 3.44 (t, 4H); 3.54-3.71 (m, 32H); 6.69 (dd, 4H); 7.73 (dd, 4H).

2H: $^1$H-NMR (CDCl$_3$, 300 MHz): δ 0.89 (t, 6H); 1.24-1.30 (m, 60H); 1.51-1.62 (broad m, 4H); 2.80 (s, 6H); 3.44 (t, 4H); 3.54-3.71 (m, 24H); 6.69 (dd, 4H); 7.73 (dd, 4H).

2I: $^1$H-NMR (CDCl$_3$, 300 MHz): δ 0.03 (s, 132H); 0.49 (m, 8H); 0.84 (t, 6H); 1.23-1.32 (m, 8H); 1.48-1.61 (broad m, 4H); 3.05 (s, 6H); 3.35 (t, 4H); 3.57 (m, 8H); 6.63 (dd, 4H); 7.72 (dd, 4H).

2J:

In order to tune the properties of the charged electrophoretic particles the counter ions of the positively charged particles may be entirely or partially replaced following the example given below:

0.8 g of compound 105-2O suspended in about 8 ml of ethanol are added to 8 ml of water containing e. g. about 0.72 g of commercial sodium tetraphenyl borate and are stirred at room temperature for 2 h. The mixture is then centrifuged and the precipitate treated as above for four more times. Finally, the residue is washed with ethanol, diethyl ether and lyophilized from benzene. The resulting blue powder contains about 0.11% (w/w) boron, which means that about 50% of the chloride ions of compound 105-2O have been exchanged by tetraphenyl borate anions to give compound 105-2O'. Further examples are compiled in the table below.

| Counter-ion | Rz | example |
|---|---|---|
| phenyl$_4$B$^-$ | Methyl | 105-2O' |
| (octylO)$_2$P(O)O$^-$ | Methyl | 105-2O'' |
| (butylO)$_3$octylOB$^-$ | Methyl | 105-2O''' |
| phenyl$_4$B$^-$ | Dodecyl | 105-2B' |
| (Iso-octylO)$_2$P(O)O$^-$ | dodecyl | 105-2B'' |

The compounds 105-2B" or 105-2O" can alternatively be obtained via a deprotonation step and a reprotonation with the appropriate phosphoric acid derivative. An application test is performed as described in example 5:

Example 2

Magenta Colored Particles According to the Invention

In analogy to the preceding compound, it is possible to obtain a magenta dye derivatised particle of the formula (107) via the pyrrilium intermediate (106):

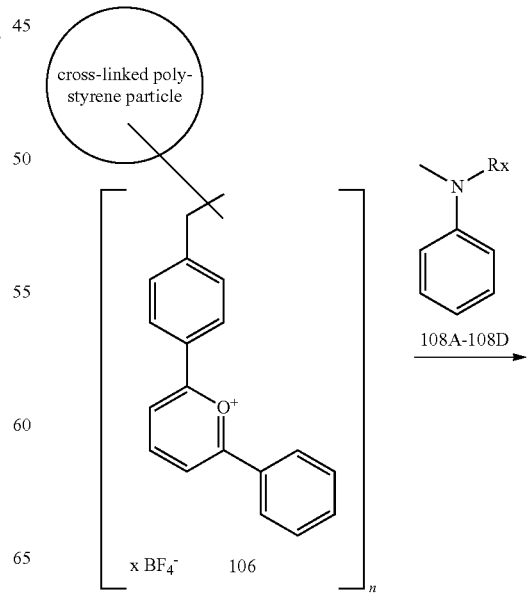

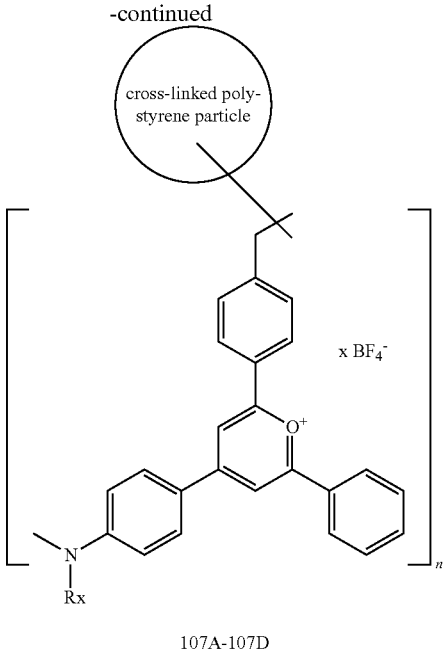

107A-107D wherein n is an integer larger than zero and n in 107 may be equal or smaller than in 106 if not all pyrilium moieties react.

By reaction with N,N-dialkyl anilines, e.g. N,N-dimethylaniline 108A, the final colored particles of the formula (107) are obtained.

A general preparation protocol runs as follows:

In a first step a mixture of 2.16 g freshly distilled styrene, 0.12 g freshly distilled para-divinyl benzene and 0.12 g of diketone (107c) (preparation see below) are emulsified in degassed distilled water (28 ml) containing 8.0 mg sodium hydrogen carbonate and 112 mg sodium dodecyl sulphate (Fluka) under a nitrogen atmosphere for 15 minutes at 70° C. under stirring at 500 Upm. After that time, the polymerisation is initiated by the addition of 13 mg potassium peroxo disulphate (Fluka) dissolved in 2.0 ml of distilled water via a syringe. The mixture is stirred at 70° C. for 22 h forming an emulsion. After cooling to room temperature, the mixture is filtered through a paper filter (qual. 54 or 75 from Ederol, Germany). The filtrate is subsequently precipitated from 300 ml methanol containing a few drops of brine and centrifuged at 4000 Upm for 15 to 20 minutes. The precipitate is then resuspended in methanol and centrifuged again (4 times) until no starting monomers (e.g. compound 107c) can be detected by thin layer chromatography in the supernatant. The resulting residue is then again centrifuged from diethyl ether, 5 times, and stored as suspension in benzene for further processing.

A benzene suspension, ca. 25 ml, containing about 2.5 g of the above particles is heated together with 9 ml of acetic acid and 9 ml of boron trifluoro etherate to 80° C. for about 20 h to give a yellow suspension. To this suspension are added 15 ml of N,N-dimethyl amine 108A and the mixture is heated to 80° C. for another 20 h. After cooling down the reaction mixture is poured into diethyl ether and centrifuged. The residue is again taken up in ether and centrifuged for three more times. The ether is then exchanged by dodecane to leave a dark magenta suspension. A TEM shows a particle size of about 30 nm of this homogenous spherical material.

The counterions may be exchanged as described above for the blue particles (105-2O). According this protocol, a series of magenta particles can be obtained. Some examples are listed in the table below.

| Example | Rz | Counter-ion |
|---|---|---|
| 107A | methyl | $BF_4^-$ |
| 107A' | methyl | $Bphenyl_4^-$ |
| 107B | dodecyl | $BF_4^-$ |
| 107C | octadecyl | $BF_4^-$ |
| 107D | I-octyl | $BF_4^-$ |

Preparation of the Precursor Molecules:

4.8 g magnesium turnings are suspended in an argon atmosphere in 50 ml of dry tetrahydrofuran at 0° C. Then 18.4 g of para-bromo styrene in 20 ml of dry tetrahydrofuran are added within three hours under vigorous stirring. This mixture is stirred for an additional hour and then cooled down to −78° C. At this temperature the mixture is treated with 13.3 g acetic acid anhydride, dissolved in 90 ml of dry diethyl ether. The reaction is kept at −78° C. for 18 hours and then quenched with 150 ml saturated ammonium chloride solution below −20° C., followed by the addition of a solution of 5% sodium hydroxide and brine. Extraction with diethyl ether and evaporation of the solvent leaves an oily residue which is distilled at a Kugelrohr (0.2 mbar/110° C.) to give 11.2 g of the keton (107a).

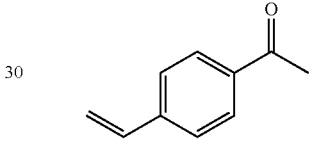

107a 107 a: $^1$H-NMR (CDCl$_3$, 300 MHz): δ 2.59 (s, 3H), 5.39 (d, 1H), 5.90 (d, 1H), 6.72 (dd, 1H), 7.48 (broad d, 2H), 7.91 (broad d, 2H).

10.1 g of this ketone are dissolved at room temperature in 30 ml of dry dimethyl formamide which contains 23.5 ml triethyl amine and 13.5 ml chloro trimethylsilan and are heated to 50° C. for 18 hours in an argon atmosphere. The brown solution is cooled down and successively extracted with hexane. The organic phase is washed with ice-cold saturated sodium hydrogen carbonate until neutral and dried over sodium. Removal of the solvent and Kugelrohr distillation of the residue at 0.3 mbar/100° C. leaves the silyl enolether 107b, 12.1 g, as a colorless oil.

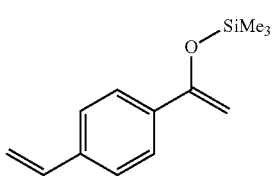

107b 4.0 g of this silylether and 2.4 g of vinyl phenylketone (J. L. Gras Tetrahedron Lett. 1978, 32, 2955) are dissolved in 80 ml of dry dichloromethane in an argon atmosphere and cooled to −78° C. This solution is treated with a mixture of 2 ml titanium tetrachloride and 2.2 ml titanium tetra-iso propoxide, dissolved in 40 ml dichloromethane. After 20 min the reaction mixture is quenched with a solution of saturated sodium hydrogen carbonate below −20° C. and extracted with diethyl ether. The organic phase is subsequently washed with saturated sodium hydrogen carbonate and brine and finally dried over sodium sulfate. Filtration and evaporation of the solvent leaves a residue, which is taken up in a minimum of diethyl ether and crystallized at −20° C. to yield 2.15 g of the desired 1,5-diketone 107c. This ketone is used for the polymerisation reactions without further manipulations (see above).

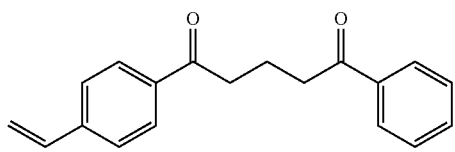

107c 107 c: $^1$H-NMR (CDCl$_3$, 300 MHz): δ 2.21 (quint., 2H), 3.11 (dt, 4H), 5.41 (d, 1H), 5.89 (d, 1H), 7.43-7.49 (m, 5H), 7.92-7.99 (m, 4H).

Example 3

Yellow Colored Particles According to the Invention

Using methods corresponding to those described herein above, charged yellow particles 109 of the following formula are obtained e. g.:

A mixture of 2.1 g freshly distilled styrene, 0.15 g freshly distilled para-divinyl benzene and 0.75 g of para-amino styrene are emulsified in degassed distilled water (36 ml) containing 10.0 mg sodium hydrogen carbonate and 140 mg sodium dodecyl sulphate (Fluka) under a nitrogen atmosphere for 15 minutes at 70° C. under stirring at 500 Upm. After that time, the polymerisation is initiated by the addition of 16 mg potassium peroxo disulphate (Fluka) dissolved in 2.5 ml of distilled water via a syringe. The mixture is stirred at 70° C. for 22 h forming a bluish emulsion. After cooling to room temperature, the mixture is filtered through a paper filter (qual. 54 or 75 from Ederol, Germany). The filtrate is subsequently precipitated in 250 ml methanol and centrifuged at 4000 Upm for 15 to 20 minutes. The precipitate is then resuspended in methanol and centrifuged again (3 times) until no starting monomers can be detected by thin layer chromatography in the supernatant. The polymer latices are preferably stored in benzene. For the ensuing analytics a sample is lyophilized which gives 7.0% nitrogen per gram polymer which is about 5 mmol amino styrene per gram.

The resulting particles, suspended in benzene, are treated with two equivalents of para-N,N-diethyl benzaldehyde and a catalytic amount of formic acid for 109 A or (hexadecylO)$_2$P(O)OH for 109 A' at room temperature whereby an orange-yellow residue forms (109 with Rz being ethyl). The particles are precipitated in methanol and purified as described for the blue and magenta particles described. Also one or both of the ethyl residues on the nitrogen may be replaced by RZ (e.g. in 109 it is ethyl) as described in the above examples. About 1.10 mmol 0 to 1.30 mmol color per gram have been incorporated that way.

(109)

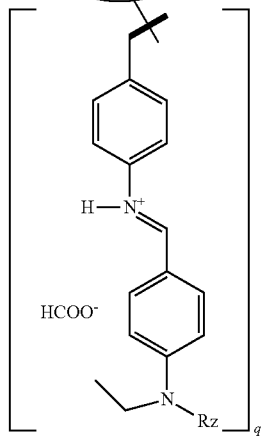

Example 4

Other Blue Colored Particles According to the Invention

According the general concept, first a neutral precursor particle 110c is produced via the latex 110b.

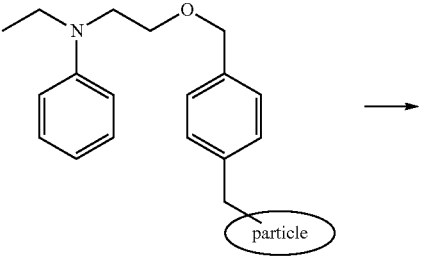

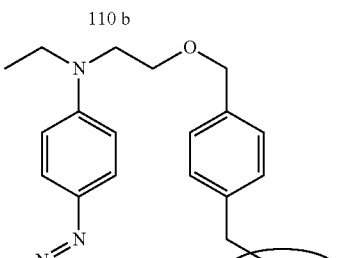

110 b

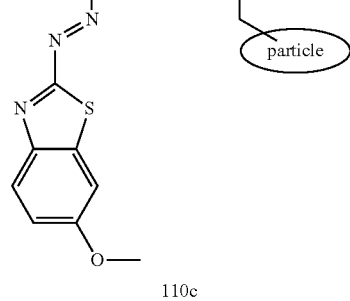

110c

-continued

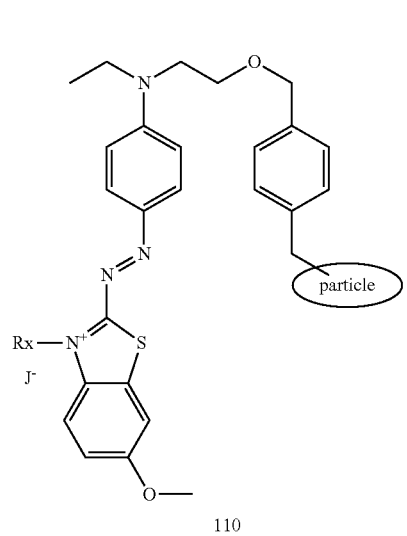

110

Rx = Me

A mixture of 12.8 g of freshly distilled styren, 1.6 g of para-divinyl benzene and 1.6 of the precursor monomer 110 a (see below) is emulgated in 183 ml of water containing 0.75 g of sodium dodecyl sulfate for about 45 min at room temperature. After that time 0.05 g of potassium peroxo disulfate are added and the mixture heated to 70° C. for 20 h. Purification is performed by repeated precipitation as described in example 1. The latex 110 b is finally taken up in ethanol for the subsequent reaction.

To 60 ml of this ethanol suspension (containing 62 mg solid per ml, according 0.51 mmol aniline derivative 110 a based on elemental analysis) and 13 mg of amido sulfonic acid, which is cooled to 0° C. are added portionwise a solution of the known diazonium salt (DE 444 46 382), prepared in situ from 247 mg of 2-amino-7-methoxy benzothiazole, 106 mg sodium nitrite and 0.285 ml 96% sulfuric acid in 3 ml of water at 0° C., and stirred at 0° C. for 3 h. Purification of this material is performed as in example 1 by repeated centrifugation from ethanol and methanol until no starting material can be detected in the supernatants. A final elemental analysis confirms a dye contents of about 0.093 mmol per gram particles 110. The comonomer 110 is prepared from 20.0 g of commercial N-ethyl, N-2-hydroxy ethylene aniline and 18.5 g para-vinyl benzylchloride in 150 ml tetrahydrofuran in the presence of 7.0 g (50% w/w) sodium hydride at 1° C. The mixture is stirred at room temperature until complete consumption of the starting materials, filtered, evaporated and then purified over a silica gel column (eluent hexane-ethyl acetate:14-1 (v/v)) to give 11.7 g of compound 110.

110: $^1$H-NMR (CDCl$_3$, 300 MHz): δ 1.14 (t, 3H); 3.39 (q, 2H); 3.52 (t, 2H); 3.63 (t, 3H); 4.50 (s, 3H); 5.24 (dd, 1H); 5.76 (dd, 1H); 6.10-6.75 (m, 4H); 7.16-7.28 (m, 2H); 7.25 (d, 2H), 7.37 (d, 2H).

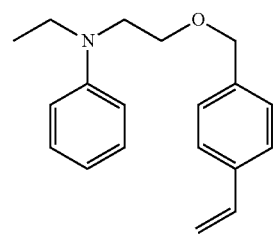

110a

Example 5

Preparation of a Dispersion of the Above Nano Particles for Zeta-Potential and Mobility Measurements in and Electric Field A dispersion is formed from the particles obtained in Example 1 for 4 by adding them to a solvent based on dodecanes. The dispersion is then used for the preparation of an electrophoretic device, by being placed between electrodes at least one of which is transparent, and a display is thus produced.

Detailed Description for a Dispersion of 105-2B:

A dispersion was prepared by ultrasonically dispersing for 30 min in a Bandelin Sonorex Super RH 102 H sonicator, at 25° C., 0.5 g of blue charged particles 105-2B into 8 ml of Dodecane (0.748 g/cm$^3$) (Fluka). To this dispersion 1.5 g of an EFKA methacrylate based diblock polymer was added. (The dispersant is a block copolymer. Preferred structures are random copolymers, block copolymers or graft copolymers, most preferred are block copolymers. Preferably, the chemistry of the dispersant is based on a polyacrylate or a copolymer build from at least two ingredients selected from the group consisting of acrylate, ester and urethane moieties, most preferably it contains at least one acrylate as monomeric unit.)

The dispersion was than sonicated for 30 in the Sonorex Super RH 102 H sonicator. The dispersed charged particles showed a zeta potential (ξ) of 39.0 mV as measured by means of a Malvern Zetasizer Nanoseries and, an electrophoretic mobility μ, as calculated from the Smoluchowsky relation (ξ=μη/∈ where μ is the mobility, η=1.38 cp is the viscosity of the medium and ∈=2.0 is the dielectric constant) of 0.034× 10$^{-8}$ m$^2$/Vs.

Detailed description for a dispersion of 105-2B': A dispersion was prepared by ultrasonically dispersing for 30 min in a Bandelin Sonorex Super RH 102 H sonicator, at 25° C., 0.5 g of blue charged particles 105-2B' into 8 ml of Dodecane (0.748 g/cm$^3$) (Fluka). To this dispersion 1.5 g of an EFKA methacrylates based diblock polymer was added. The dispersion was than sonicated for 30 in the Sonorex Super RH 102 H sonicator.

The dispersed charged particles showed a zeta potential (ξ) of 65 mV as measured by means of a Malvern Zetasizer Nanoseries and, an electrophoretic mobility μ, as calculated from the Smoluchowsky relation (ξ=μη/∈ where μ is the mobility, η=1.38 cp is the viscosity of the medium and ∈=2.0 is the dielectric constant) of 0.055×10$^{-8}$ m$^2$/Vs.

Detailed Description for a Dispersion of 105-2B:

A dispersion was prepared by ultrasonically dispersing for 2 h and 30 min in a Bandelin Sonorex Super RH 102 H sonicator, at 25° C., 0.0325 g of blue charged particles 105-2B into 1.5 g of Isopar G (0.748 Kg/cm$^3$) (Exxon Mobil).

The surface modified dispersed charged pigment particles showed a zeta potential (ξ) of 39.0 mV as measured by means of a Malvern Zetasizer Nanoseries and, an electrophoretic mobility μ, as calculated from the Smoluchowsky relation (ξ=μη/∈ where μ is the mobility, η=1.46 cp is the viscosity of the medium and ∈=2.0 is the dielectric constant) of $0.034 \times 10^{-8}$ m²/Vs.

Detailed Description for a Dispersion of 105-2A:

A dispersion was prepared by ultrasonically dispersing for 2 h and 30 min in a Bandelin Sonorex Super RH 102 H sonicator, at 25° C., 0.15 g of blue charged particles 105-2A into 2 g of Isopar G (0.748 Kg/cm³) (Exxon Mobil).

The dispersed charged particles have a diameter of 143 nm as measured by dynamic light scattering by means of a Malvern Zetasizer Nanoseries.

The surface modified dispersed charged pigment particles showed a zeta potential (ξ) of 30 mV as measured by means of a Malvern Zetasizer Nanoseries and, an electrophoretic mobility μ, as calculated from the Smoluchowsky relation (ξ=μη/∈ where μ is the mobility, η=1.46 cp is the viscosity of the medium and ∈=2.0 is the dielectric constant) of $0.001 \times 10^{-8}$ m²/Vs.

Additional advantages and modifications will readily occur to those skilled in the art. Therefore, the invention in its broader aspects is not limited to the specific examples and detailed embodiments shown and described above. Accordingly, various modifications may be made without departing from the spirit of the general inventive concepts with respect to the appended claims and their equivalents.

What is claimed is:

1. A method of manufacture for charged colored particles comprising:
    in a first step, copolymerizing an uncharged polymerizably functionalized precursor of a charged dye radical, also called "Copolymerizable Precursor", in an emulsion polymerization reaction and,
    in a second step, reacting at least one organic precursor of the charged dye radical able to complete the dye radical in said second step, also called "Chargeless Educt", which leads to charge formation during the reaction itself and/or in one or more subsequent reactions, using the polymer-bound uncharged precursor moiety obtainable in the first reaction step, to form a polymer particle that carries one or more covalently bound charged dye radicals.

2. The method according to claim 1 further comprising:
    in the first step, subjecting the Copolymerizable Precursor, which is an uncharged polymerizably functionalized precursor of a charged dye radical, to an emulsion polymerization reaction and, in the second step, reacting at least one Chargeless Educt, which is an organic precursor of the charged dye radical, to complete the dye radical in said second step, which reaction leads to charge formation during the second step reaction and/or in one or more subsequent reactions, using the polymer-bound uncharged precursor moiety obtained in the first reaction step to form a polymer particle that carries one or more covalently bound charged dye radicals.

3. The method according to claim 1, where in the first step the Copolymerizable Precursor is homogenously dissolved in the bulk monomer or monomer mixture forming an oil solution which is emulsified in an aqueous phase in the presence of surface active agents to form an emulsion with oil droplets for an emulsion polymerization, and/or the Copolymerizable Precursor is added to a pre-formed emulsion of the monomer mixture and then mixed in, the obtained mixture is then polymerized by addition of an initiator to give uncharged particles, wherein said uncharged particles have a diameter from 5 to 1000 nm derivatised with covalently bound uncharged organic dye radical precursors, substantially homogeneously distributed in the particle matrix; and then, in the second step, which may comprise one or more parallel or consecutive reactions, the complete dye radical and the corresponding charge are produced on the particle by reacting the Chargeless Educt to form the corresponding charged dye-carrying particles, thus effecting both the formation of the final color by completion of the dye radical and the introduction of a positive or negative charge on the dye radical, and the introduction of steric groups which can ensure the dispersability of the particles in a dielectric medium.

4. The method according to claim 1 where the emulsion polymerization in the first step is a micro emulsion polymerization.

5. The method according to claim 1 wherein the aqueous phase of the emulsion in the emulsion polymerization comprises from about 98% to 60% by total weight of the reaction mixture.

6. The method according to claim 1 wherein the pH of the aqueous phase in the emulsion polymerization is in the range from 2 to 12.

7. The method according to claim 1 wherein the polymerization temperature in the emulsion polymerization is chosen in a range of from 0° C. to 130° C.

8. The method according to claim 1 wherein the monomers that form the basis of the particle matrix and into which the Copolymerizable Precursor is integrated are selected from the group consisting of styrene, ((di)-$C_1$-$C_4$-alkyl)styrenes, $C_1$-$C_{18}$alkyl (meth-) acrylates, vinyl-$C_1$-$C_{18}$alkyl ethers, vinyl-$C_1$-$C_{18}$ alkyl ketones and vinyl-$C_1$ to $C_{18}$ esters.

9. The method according to claim 1 wherein the Copolymerizable Precursor used in the polymerization reaction carries at least one polymerizable appendix or comprised an integrated group carrying at least one ethylenically unsaturated aliphatic moiety which is unsubstituted or substituted and is a precursor for a charged dye molecule selected from the group consisting of cyanine, isocyanine, pseudocyanine, hemicyanine, carbocyanine, styryl, zeromethine, merocyanine, polycarbocyanine, pyocyanine, streptocyanine, aminoaryleneamine, mono-, di-, tri- or tetraazamethine, azacarbocyanine, diazahemicyanine, diphenylmethane, quinone imine, positively charged triarylmethane, positively charged triphenylmethane, positively charged naphthyldiphenylmethane, triphenylmethane, acridine, azine type, phenazine, oxazine, phenoxazine, thiazine, phenothiazine, methane-azo, polymethine azo, positively charged pyrylium, positively charged flavylium, positively charged anthraquinone, positively charged perinone, positively charged naphthalimide, positively charged quinophthalone, neutrocyanine, positively charged nitro, positively charged naphthol, positively charged dye with sulfur or phosphorus as the charge-carrying group, sulfonium, isothiuronium, tri(aryl or alkyl)ated phosphonium group, reaction product of a monochlorotriazinyl dye with a tertiary amine, negatively charged polymethine, negatively charged oxonole, negatively charged phenylogous methin, negatively charged azamethin, phthalein, (thio)xanthene, heterophthalein, tetrazolium dye, positively charged azo dye with onium group wherein said onium group is not directly coupled to the azo group, cationic azo containing the positive charge at a trialkylammonium or cycloammonium group, or with cycloammonium groups attached to an azo group by a carbon attached to the ring system, 1,2-diazole, 1,3-diazole, hydrogenated 1,2-diazole, hydrogenated 1,3-diazole comprising three nitrogen atoms as the only ring atoms, (benzo)thiazole, hydrogenated (benzo)thiazole, and diazahemicyanine, and wherein the Chargeless Educt is a correspondingly chosen molecule completing the dye radical and its charge during the second reaction step.

10. The method according to claim 1, wherein the charge is formed during the second reaction step and the Copolymerizable Precursor as well as any Chargeless Educt used carry no electric charge.

11. The method according to claim 1 wherein the Polymerizable Precursor and the Chargeless Educt in the first and second step form a dye radical of a triarylmethane dye of the formula (A),

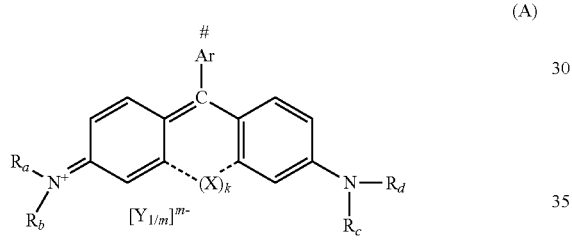

(A)

wherein

Ar is $C_6$-$C_{14}$aryl, and is substituted with N-mono- or N,N-di-($C_1$-$C_{45}$-alkyl-, $C_2$-$C_{45}$-alkenyl, phenyl-$C_1$-$C_{45}$-alkyl and/or phenyl-$C_2$-$C_{45}$-alkenyl)-amino;

X is absent (k=0) or present (k=1) and is O, S or $NR_e$;

$R_a$, $R_b$, $R_c$ and $R_d$ are independently selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$-alkyl$)_2$ and/or $Si(C_1$-$C_{45}$-alkyl$)_2$—O;

or one of $R_a$ and $R_b$ and/or one of $R_c$ and $R_d$ is aryl or aryl-$C_1$-$C_7$-alkyl;

$R_e$ is hydrogen, $C_1$-$C_{45}$-alkyl, phenyl, naphthyl, phenyl-$C_1$-$C_{45}$-alkyl or phenyl-$C_1$-$C_{45}$-alkyl;

Y is an anion and m is 1, 2, 3 or 4;

and where the symbol # in formula (A) indicates the preferred position for the binding bond or linker forming the covalent bond or bonds to the particle; and where radical means that a hydrogen of the dye is removed and instead a bond or linker to the particle is present.

12. The method according to claim 11, wherein the Copolymerizable Precursor for the radical of a dye of the formula (A), including the olefinic moiety for forming the linker, is one of the formula (AI)

(AI)

wherein Ar is as defined for a compound of the formula A and PG is a polymerizable functional group which is bound directly to Ar or bound to a carbon of a N-mono- or N,N-di-($C_1$-$C_{45}$-alkyl-, $C_2$-$C_{45}$-alkenyl, phenyl-$C_1$-$C_{45}$-alkyl and/or phenyl-$C_2$-$C_{45}$-alkenyl)-amino substituent of Ar, and the corresponding Chargeless Educt for forming the dye of the formula (A) or the corresponding radical, respectively, is a benzophenone compound of the formula (AII),

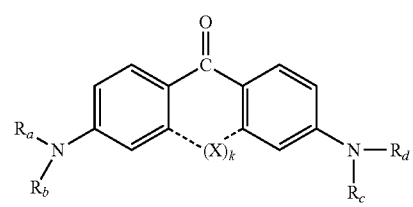

(AII)

wherein X, Y, $R_a$, $R_b$, $R_c$, $R_d$, m and k are as defined for a compound of the formula (A).

13. A method according to claim 12, wherein as Copolymerizable Precursor a compound of the formula (AI*)

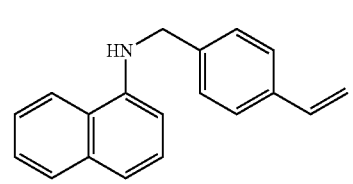

(AI*)

is, in the first step, copolymerized by emulsion polymerization to give corresponding particles of the formula IA*,

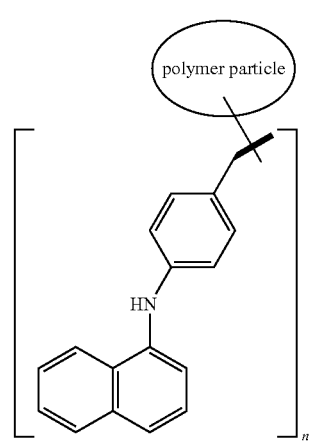

(IA*)

wherein the bold line marks an ethylene or ethantriyl moiety wherein the Ar radical represented in brackets (directly from the aryl moiety or a carbon of an N-mono- or N,N-di-($C_1$-$C_7$-alkyl-, $C_2$-$C_7$-alkenyl, phenyl-$C_1$-$C_7$-alkyl and/or phenyl-$C_2$-$C_7$-alkenyl)-amino) is bound to the particle polymer scaffold, and the polymer particle is based on the radical polymerization of styrene, ((di)-$C_1$-$C_4$-alkyl) styrenes, $C_1$-$C_{18}$alkyl (meth-) acrylates, vinyl-$C_1$-$C_{18}$alkyl ethers, vinyl-$C_1$-$C_{18}$ alkyl ketones and/or vinyl-$C_1$-$C_{18}$ esters and n is an integer of 1 or larger; which, in the second step is then reacted with, as a Chargeless Educt, a compound of the formula (AII), under reaction conditions as described for the charge and dye formation, to the corresponding particles of the formula (AAA*), (AAA*)

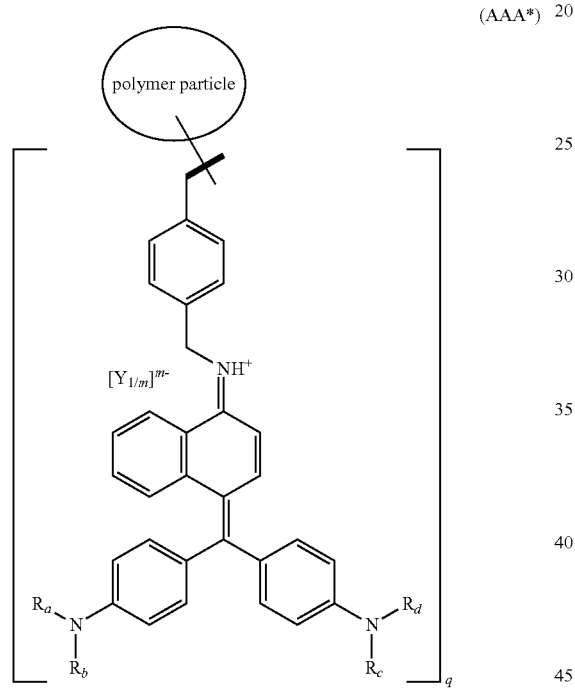

wherein $R_a$, $R_b$, $R_c$, $R_d$ Y and m are as defined for a compound of the formula (AII), each, independently of the other, being $C_1$-$C_{45}$-alkyl; where in each case in the $C_1$-$C_{45}$-alkyl one or more hydrogen atoms can be replaced with fluorine and/or wherein one or more $CH_2$ groups other than those binding to N can be replaced with O, $Si(C_1$-$C_{45}$-alkyl$)_2$ and/or $Si(C_1$-$C_{45}$-alkyl$)_2$—O; q is an integer equal to or larger than 1, and the bold line marks an ethylene or ethantriyl moiety via which the Ar radical represented in brackets is bound to the particle polymer scaffold, thus obtaining said particles of the formula (AAA*) as colored charged particles.

14. A method according to claim 13, wherein the Copolymerizable Precursor and the Chargeless Educt are chosen so that a colored charged particle of the following formula can be obtained:

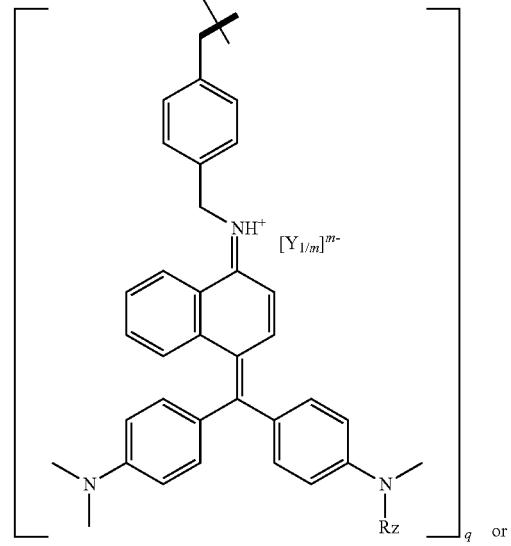

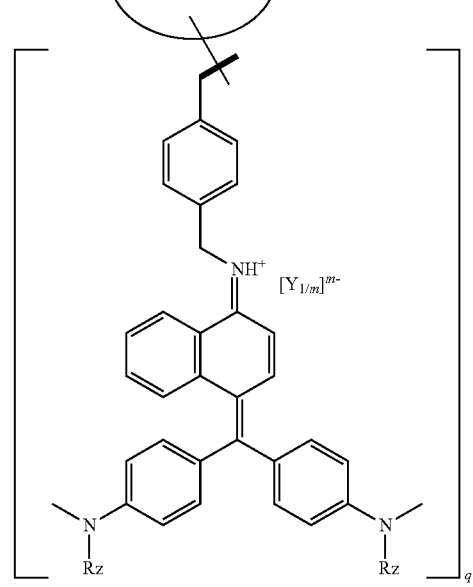

wherein Y is an anion, m is an integer of 1 to 4 and Rz is $C_1$-$C_{18}$alkyl or $C_3$-$C_{45}$alkyl wherein one or more $CH_2$ groups other than those binding to N are replaced by O, $Si(CH_3)_2$ and/or $Si(CH_3)_2$—O; or Rz is methyl, n-octyl, n-dodecyl, n-octadecyl, —$CH_2CH_2$—$(OCH_2CH_2)_3$—O—$(CH_2)_{11}CH_3$, —$CH_2CH_2$—$(OCH_2CH_2)_2$—O—$(CH_2)_{17}CH_3$, or —$CH_2CH_2OCH_2CH_2CH_2$—$Si(CH_3)_2$—(O—$Si(CH_3)_2)_{ca.11}$—$OSi(CH_3)_2$—$CH_2CH_2CH_2CH_3$.

15. The method according to claim 1 wherein the Copolymerizable Precursor and the Chargeless Educt in the first and second step form a dye radical of a pyrylium dye of the formula (B),

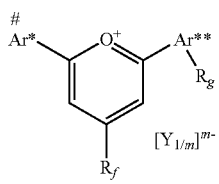
(B)

wherein Ar* and Ar**, independently of the other, are $C_6$-$C_{14}$aryl;

$R_f$ is hydrogen or $C_1$-$C_{45}$alkyl wherein one or more hydrogen atoms can be replaced with fluorine and which is linear or branched wherein one or more $CH_2$ groups may be replaced with O, $Si(C_1$-$C_7alkyl)_2$ and/or $Si(C_1$-$C_7alkyl)_2$—O; or $R_f$ is phenyl or naphthyl that is unsubstituted or substituted by $C_1$-$C_{45}$alkyl wherein one or more hydrogen atoms can be replaced with fluorine and which is linear or branched wherein one or more $CH_2$ groups may be replaced with O, $Si(C_1$-$C_{45}$-alkyl)$_2$ and/or $Si(C_1$-$C_{45}$-alkyl)$_2$—O, or by $NK_1K_2$ wherein $K_1$ and $K_2$ are independently from each other selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$-alkyl)$_2$ and/or $Si(C_1$-$C_{45}$-alkyl)$_2$—O; or one of $K_1$ and $K_2$ is aryl or aryl-$C_1$-$C_{45}$-alkyl, wherein aryl is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$-alkyl)$_2$ and/or $Si(C_1$-$C_{45}$-alkyl)$_2$—O;

$R_g$ is, independently from $R_f$, selected from the moieties mentioned for $R_f$;

Y is an anion and m is 1, 2, 3 or 4;

where the symbol # in formula (B) indicates the preferred position for the binding bond or linker forming the covalent bond or bonds to the particle; the part represented by broken lines is absent or present; and where radical means that a hydrogen of the dye is removed and instead a bond or linker to the particle is present.

16. The method according to claim 15, wherein the Copolymerizable Precursor for a radical of the dye of the formula (B), including the olefinic moiety for forming the linker, is a 1,5-diketone of the formula (BI)

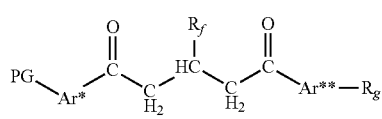
(BI)

wherein Ar*, Ar**, $R_f$ and $R_g$ are as having been defined for a compound of the formula B and PG is a polymerizable functional group;

and the corresponding Chargeless Educt of a compound of the formula B is the polymer-bound product of the first step with the formula (IB),

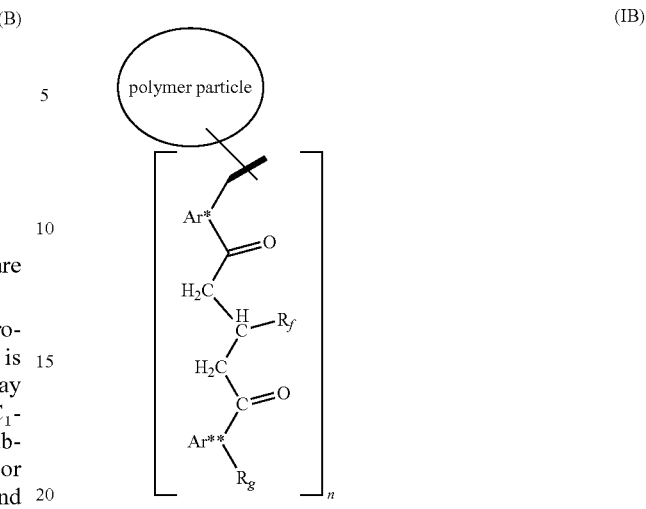
(IB)

where the polymer particles are based on the polymerization product of styrene and styrene derivatives, that is, cross-linked polystyrene particles; Ar* is as defined for a compound of the formula B in claim 13, n is a natural number, and the bold line "━━" marks the ethylene or ethantriyl moiety via which the radicals represented in brackets are bound to the particle polystyrene scaffold, which may be bound directly to the aromatic ring of Ar* or to a N-mono- or N,N-di-($C_1$-$C_{45}$-alkyl-, $C_2$-$C_{45}$-alkenyl, phenyl-$C_1$-$C_{45}$-alkyl and/or phenyl-$C_2$-$C_{45}$alkenyl)-amino substituent comprised in Ar;

which is then in the second dye- and charge-forming step reacted as a Chargeless Educt in the presence of an acid and an oxidizing agent to form the corresponding charged and dyed electrophoretic particles of the formula (BBB),

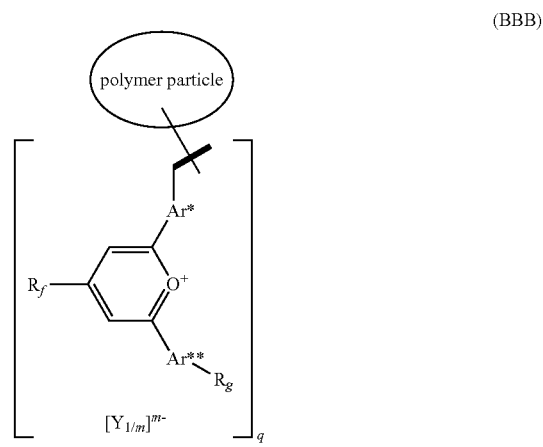
(BBB)

wherein the polymer particle is as defined under formula (IB) and Ar*, Ar**, $R_f$, $R_g$, Y and m are as defined for a compound of the formula (B) above and g is an integer equal to or larger than 1, and the bold line marks an ethylene or ethantriyl moiety via which the Ar radical represented in brackets is bound to the particle polymer scaffold, and where only one of the mesomeric forms all of which are meant to be included is shown;

and, if desired, $R_f$ in the obtainable electrophoretic particles of the formula (BBB) is hydrogen, then this hydrogen is replaced by a different moiety $R_f^*$ which is phenyl or naphthyl that is unsubstituted or substituted by $C_1$-$C_{45}$alkyl wherein one or more hydrogen atoms can be replaced with fluorine and which is linear or branched wherein one or more $CH_2$ groups may be replaced with O, $Si(C_1$-$C_{45}$-alkyl$)_2$ and/or $Si(C_1$-$C_{45}$-alkyl$)_2$—O, or by $NK_1K_2$ wherein $K_1$ and $K_2$ are independently from each other selected from $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$-alkyl$)_2$ and/or $Si(C_1$-$C_{45}$-alkyl$)_2$—O; or one of $K_1$ and $K_2$ is aryl or aryl-$C_1$-$C_{45}$-alkyl, wherein aryl is unsubstituted or substituted with $C_1$-$C_{45}$alkyl wherein one or more hydrogen atoms can be replaced with fluorine and which is linear or branched wherein one or more $CH_2$ groups other than those binding to N may be replaced with O, $Si(C_1$-$C_{45}$-alkyl$)_2$ and/or $Si(C_1$-$C_{45}$-alkyl$)_2$—O by reaction of the particles of the formula (BBB) with a compound of the formula (BII)

$$HR_f^* \qquad (BII)$$

wherein $R_f^*$ has a meaning as just defined; to give the corresponding particles of the formula (BBB) wherein $R_f$ is $R_f^*$ as just defined.

17. A method according to claim 16, wherein as Copolymerizable Precursor a compound of the formula (BI*),

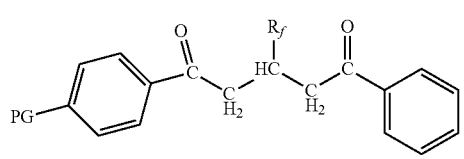

(BI*)

wherein PG is a polymerizable functional group, and $R_f$ is hydrogen,
is, in the first reaction step, copolymerized to give corresponding particles of the formula (IB*),

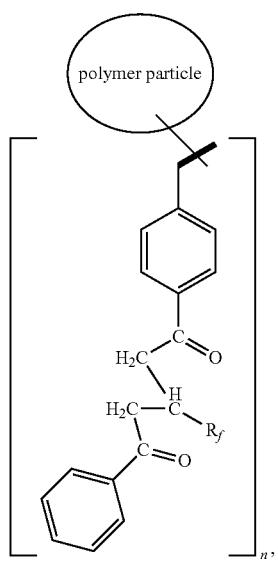

(IB*)

wherein $R_f$ is hydrogen, n is an integer of 1 or larger, the bold line marks an ethylene or ethantriyl moiety wherein the Ar radical represented in brackets is bound to the particle polymer scaffold and the polymer particle is based on the radical polymerization of styrene, ((di)-$C_1$-$C_4$-alkyl) styrenes, $C_1$-$C_{18}$alkyl (meth-) acrylates, vinyl-$C_1$-$C_{18}$alkyl ethers, vinyl-$C_1$-$C_{18}$ alkyl ketones and/or vinyl-$C_1$-$C_{18}$ esters, to give corresponding particles of the formula (IB*),

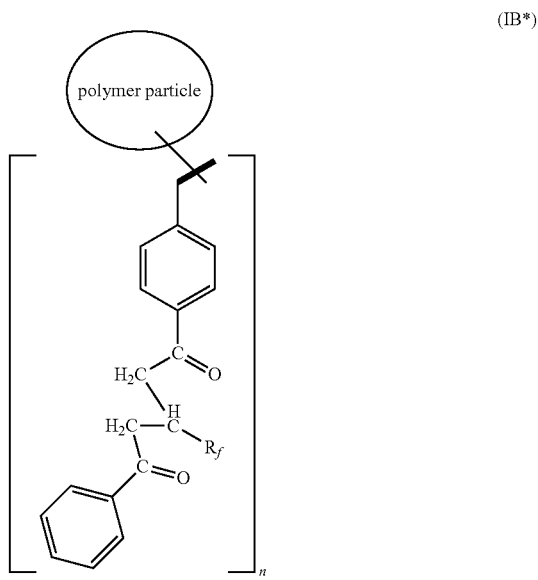

(IB*)

wherein n is an integer of 1 or larger, $R_f$ is hydrogen and the polymer particle and the bold line have the meaning given under formula (IB*) which, in the second (dye- and charge-forming) step is then reacted under cyclization in the presence of an acid and an oxidizing agent to the corresponding particles of the formula (BBB*)

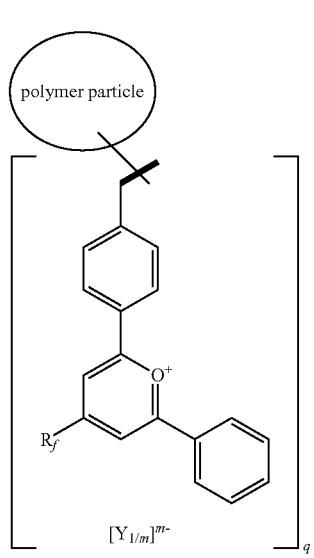

(BBB*)

wherein $R_f$ is hydrogen, Y is an anion, m is an integer of 1 to 4, q is an integer of 1 or larger and the polymer particle and the bold line have the meanings indicated for particles of the formula (BBB); and reacting a compound of the formula (IB*), coupling a compound of the formula (BII), HR<sub>f</sub>*  (BII)

wherein R<sub>f</sub>* is phenyl or naphthyl that is unsubstituted or substituted by NK$_1$K$_2$ wherein K$_1$ and K$_2$ are independently from each other selected from $C_1$-$C_{45}$alkyl wherein one or more hydrogen atoms can be replaced with fluorine and which is linear or branched wherein one or more CH$_2$ groups other than those binding to N may be replaced with O, Si($C_1$-$C_{45}$-alkyl)$_2$ and/or Si($C_1$-$C_{45}$-alkyl)$_2$—O; thus obtaining a compound of the formula (BBB*) given above as the charged colored particles wherein R<sub>f</sub> has the meanings just given for R<sub>f</sub>*.

18. The method according to claim 1 wherein the Copolymerizable Precursor and the Chargeless Educt in the first and second step form a dye radical of a pyrylium dye of the formula (C),

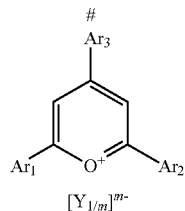

(C)

wherein Ar$_1$ and Ar$_2$, independently of the other, are $C_6$-$C_{14}$aryl;

Ar$_3$ is $C_6$-$C_{14}$aryl, and is substituted with $C_1$-$C_{45}$-alkanoyloxy;

Y is an anion and m is 1, 2, 3 or 4; and wherein the symbol # in formula (C) indicates the preferred position for the binding bond or linker forming the covalent bond or bonds to the particle; and where radical means that a hydrogen of the dye is removed and instead a bond or linker to the particle is present;

and wherein the Copolymerizable Precursor for the radical of a dye of the formula (C), including the olefinic moiety for forming the linker, is an aldehyde of the formula (CI)

PG-Ar$_3$—CHO  (CI)

wherein Ar$_3$ is as defined above for a compound of the formula (C) and PG is a polymerizable functional group, or a form thereof wherein the aldehyde function is protected, with a $C_1$-$C_7$-alkanol, where the process comprises removal of the protection of the aldehyde function after the reaction; and the corresponding Chargeless Educt for the dye radical of the formula (C) is a ketone compound of the formula (CII)

Ar$_{1,2}$—C(=O)—CH$_3$  (CII)

wherein Ar$_{1,2}$ is defined as Ar$_1$ or Ar$_2$ for a compound of the formula (C).

19. A method according to claim 1, wherein the Copolymerizable Precursor and the Chargeless Educt in the first and second step form a dye radical of the formula D* or E*

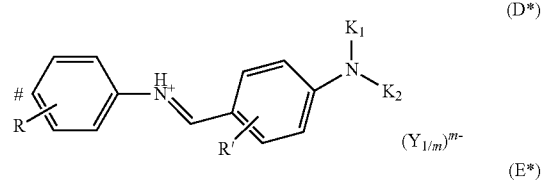

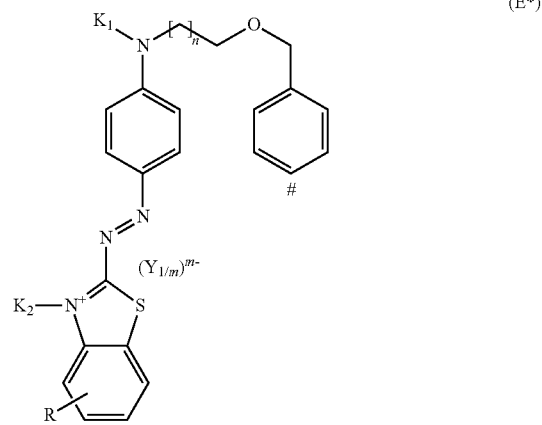

wherein Y is an anion and m is 1, 2, 3 or 4;

n is 1 or larger;

R and R' independently are hydrogen, K$_3$ or OK$_3$;

K$_1$, K$_2$ and K$_3$, independently of each other, are $C_1$-$C_{45}$-alkyl; $C_1$-$C_{45}$-alkyl wherein one or more CH$_2$ groups are replaced by O, Si($C_1$-$C_{45}$-alkyl)$_2$ and/or Si($C_1$-$C_{45}$-alkyl)$_2$—O; phenyl; naphthyl; phenyl-$C_1$-$C_{45}$-alkyl; or naphthyl-$C_1$-$C_{45}$-alkyl.

20. A method according to claim 19, wherein as Copolymerizable Precursor a vinyl aniline or R-substituted vinyl aniline is, in the first step, copolymerized by emulsion polymerization to give corresponding particles of the formula

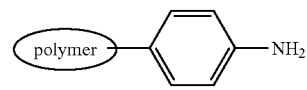

1D* which, in the second, dye- and charge-forming step is then reacted with, as a Chargeless Educt, a compound of the formula D1

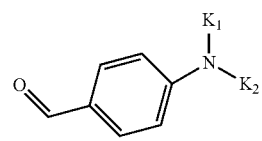

D1 to form the yellow particle DD*

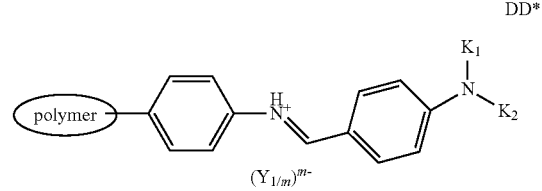

DD* or
as Copolymerizable Precursor an amine 1E

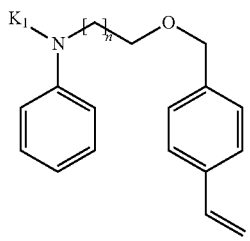

1E is, in the first step, copolymerized by emulsion polymerization to give corresponding particles of the formula 1EEE

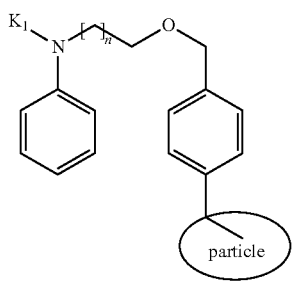

1EEE which, in the second (dye- and charge-forming) step is then reacted with, as a Chargeless Educt, a compound of the formula E2

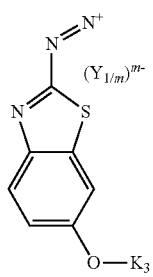

E2 to form the particle E3

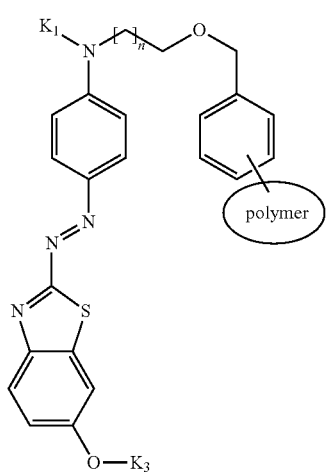

E3 which is in a subsequent, dye- and charge-forming step alkylated to give the blue particle E*

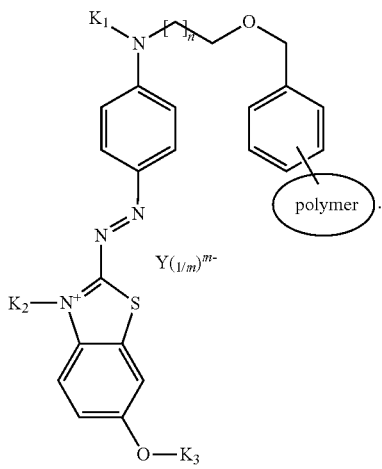

E*

21. The method according to claim 1, wherein a counterion in the obtainable charged colored particles is exchanged against a different counterion.

22. A charged colored particle obtained by the method of claim 1 wherein said colored particle is red, blue, green, yellow, magenta, cyan, black or white, and which is negatively or positively charged.

23. The particle according to claim 22 wherein said size of said particle is from 5 to 1000 nm.

24. A method for the manufacture of an electrophoretic device, comprising incorporating therein said charged colored particles according to claim 23 dispersed in a form of colloidal stable dispersion into a dielectric medium, with or without further additives.

25. A method according to claim 24 wherein said method comprises encapsulating said dispersion into single microcapsules or incorporating said dispersion in foils containing microcavities.

26. The uncharged particle obtainable as the product of method step 1 according to claim 1 wherein size of said uncharged particle is from 5 to 1000 nm.

27. A method for the manufacture of an electrophoretic device, wherein said method comprises dispersing charged particles obtainable by a process according to claim 1 into a liquid, and placing said liquid between a pair of electrodes.

28. An electrophoretic display comprising charged colored particles obtainable according to claim 1.

29. Compound of the formula

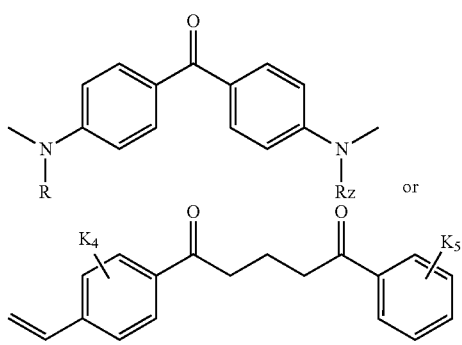

wherein $K_4$ and $K_5$ independently are $C_1$-$C_8$alkyl, $C_1$-$C_8$alkoxy, or hydrogen; and R and Rz independently are selected from $C_1$-$C_{18}$ alkyl, and $C_3$-$C_{45}$ alkyl wherein one or more $CH_2$ groups other than those bound directly to the nitrogens are replaced by O, $Si(CH_3)_2$ and/or $Si(CH_3)_2$—O; or R and Rz are independently selected from the group consisting of methyl, n-octyl, n-dodecyl, n-octadecyl, —$CH_2CH_2$—$(OCH_2CH_2)_3$—O—$(CH_2)_{11}CH_3$, —$CH_2CH_2$—$(OCH_2CH_2)_2$—O—$(CH_2)_{17}CH_3$, and —$CH_2CH_2OCH_2CH_2CH_2$—$Si(CH_3)_2$—(O—Si$(CH_3)_2)_{ca.11}$—$OSi(CH_3)_2$—$CH_2CH_2CH_2CH_3$.

* * * * *